(12) United States Patent
Fujita et al.

(10) Patent No.: US 6,754,162 B2
(45) Date of Patent: Jun. 22, 2004

(54) OPTICAL PICKUP METHOD, OPTICAL PICKUP DEVICE, AND OPTICAL INFORMATION PROCESSING APPARATUS ADAPTED WITH SPHERICAL ABERRATION CORRECTION FOR SUB-SPOT TRACKING CONTROL

(75) Inventors: Kazuhiro Fujita, Tokyo (JP); Hiroyoshi Funato, Kanagawa (JP); Hiroshi Koide, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 470 days.

(21) Appl. No.: 09/897,668

(22) Filed: Jul. 2, 2001

(65) Prior Publication Data
US 2002/0003755 A1 Jan. 10, 2002

(30) Foreign Application Priority Data
Jul. 5, 2000 (JP) ........................................ 2000-203860

(51) Int. Cl.[7] ................................................ G11B 7/00
(52) U.S. Cl. .............................. 369/112.05; 369/44.23
(58) Field of Search .......................... 369/44.37, 44.32, 369/44.26, 44.23, 53.12, 53.23, 53.28, 112.01, 112.03, 112.04, 112.05, 112.07

(56) References Cited

U.S. PATENT DOCUMENTS

| | | |
|---|---|---|
| 4,876,680 A | 10/1989 | Misawa et al. |
| 5,684,779 A | 11/1997 | Ohuchida et al. |
| 5,920,532 A * | 7/1999 | Yagi et al. ................ 369/53.22 |
| 6,072,579 A | 6/2000 | Funato |

FOREIGN PATENT DOCUMENTS

| | | |
|---|---|---|
| JP | 5-12700 | 1/1993 |
| JP | 200030290 | 1/2000 |

* cited by examiner

Primary Examiner—Paul W. Huber
(74) Attorney, Agent, or Firm—Cooper & Dunham LLP

(57) ABSTRACT

In an optical pickup method and device of the present invention, a grating unit separates a light beam, emitted by a light source, into a 0th order diffracted beam and 1st order diffracted beams. An objective lens focuses the diffracted beams, sent from the grating unit, onto a recording surface of an optical recording medium through a transparent substrate of the medium, so that a main spot is formed on the recording surface by the 0th order diffracted beam and sub-spots, interposing the main spot therebetween, are formed on the recording surface by the 1st order diffracted beams. A reflection beam detector receives reflection beams from the main spot and the sub-spots of the medium to generate detection signals from the received reflection beams. A control unit changes a pattern of the beams incident to the objective lens to correct a spherical aberration due to a deviation of a thickness of the substrate of the medium, and moves the grating unit relative to the light source to cancel shifting of sub-spot positions on the recording surface due to the spherical aberration correction, in order to generate a proper tracking error signal.

35 Claims, 12 Drawing Sheets

OPTICAL PICKUP METHOD, OPTICAL PICKUP DEVICE, AND OPTICAL INFORMATION PROCESSING APPARATUS ADAPTED WITH SPHERICAL ABERRATION CORRECTION FOR SUB-SPOT TRACKING CONTROL

BACKGROUND OF THE INVENTION

1. Field of the Invention

The present invention relates to an optical pickup method, an optical pickup device, and an optical information processing apparatus.

2. Description of the Related Art

It is known that optical pickup devices record information in and reproduce information from an optical recording medium, such as CD (compact disk) or DVD (digital video disk), by irradiating it with light. Various systems have been proposed and put into practical use.

In recent years, various optical recording media have been put into practical use, for example, CD-ROM, DVD-ROM, WORM (write once, read many) media, or RW (rewritable) media. In addition, there is a type of optical recording medium that emits a fluorescent light in accordance with the amount of the light irradiated.

Moreover, a multi-layer optical recording medium has been proposed for practical use, which includes a plurality of recording layers provided in the single medium. See "Progress In Optical Disk Recording With Over 20 GB Of Capacity" in No.MB1 of ODS 2000 symposium.

When recording information in an optical recording medium, the medium is irradiated with a light beam along the track of the medium. In order to perform the recording, the reproducing or the erasing for the optical recording medium, the light beam must be focused on the recording surface of the medium to form a beam spot thereon, and the beam spot must be accurately positioned on the rotating medium along the track thereof.

The focusing control, such as the knife-edge method or the astigmatism method, is carried out to focus the light beam on the recording surface of the medium so that beam spots are formed thereon in the focal conditions. In addition, the tracking control, such as the push-pull method, is performed to keep the beam spots on the recording surface in the focal conditions.

The sub-spot tracking control is a kind of the tracking control to keep the beam spots on the recording surface in the focal conditions. In the sub-spot tracking control, a light beam, emitted by the light source, is separated by a diffraction grating into three diffracted beams: the 0th order diffracted beam (m=0, where m indicates the order of diffraction) and the 1st order diffracted beams (m=±1). A main spot is formed on the recording surface by the 0th order diffracted beam, and a pair of sub-spots, interposing the main spot between them, are formed on the recording surface by the 1st order diffracted beams. To perform the sub-spot tracking control, a tracking error signal is generated based on the quantities of light of the reflection beams received from the sub-spots of the medium.

Moreover, by using two diffraction gratings, an improved sub-spot tracking control may be performed. In the improved sub-spot tracking control, a light beam, emitted by the light source, is separated by the diffraction gratings into five diffracted beams: the 0th order diffracted beam (m=0) and the 1st order diffracted beams (m=±1). A main spot is formed on the recording surface by the 0th order diffracted beam, and two pairs of sub-spots, interposing the main spot between them, are formed on the recording surface by the 1st order diffracted beams. To perform the improved sub-spot tracking control, a tracking error signal is generated based on the quantities of light of the reflection beams received from the four sub-spots of the medium. See, for example, Japanese Laid-Open Patent Application No.5-12700.

The optical recording media generally are configured with a transparent substrate and a recording layer (the recording surface) provided on the substrate. The light beam, emitted by the light source, is converted by the objective lens into a converging beam, and this converging beam is passed through the transparent substrate of the medium and focused on the recording surface of the medium.

According to the standards of optical recording disks, the thickness of the substrate of the optical recording media are specified depending on the type of the media. For example, the substrate of the CD type media is specified as being 1.2 mm thick, and the substrate of the DVD type media is specified as being 0.6 mm thick. However, among the products of optical recording media that are commercially available, the substrate thickness of the media generally deviates from the specified thickness due to the manufacturing errors.

The optical systems of the optical pickup devices are designed based on the specified thickness of the substrate of the medium being accessed. If the thickness of the substrate of the actually used medium significantly deviates from the specified thickness, the spherical aberration takes place due to the deviation of the substrate thickness of the medium. When the spherical aberration becomes large, the accuracy of the sub-spot tracking control will be lowered. In the conditions of the large spherical aberration, it is difficult to accurately focus the light beams onto the recording surface of the medium. It is difficult to irradiate the medium with the beam spots so as to correctly create a mark or pit on the recording surface of the medium. In such conditions, the quantities of light of the reflection beams received from the medium will be lowered, which causes the lowering of the jitter or the signal-to-noise ratio, or the deterioration of the quality of the reproduced information.

In order to eliminate the problem of the spherical aberration, a method of correcting the spherical aberration, due to the deviation of the substrate thickness of the optical recording medium, by changing a pattern of the light beams incident to the objective lens has been proposed as in Japanese Laid-Open Patent Application No.2000-30290.

In a case of an optical pickup device designed to convert the emitted light beam from the light source into a parallel light beam and make it incident to the objective lens, when the substrate thickness of the medium is larger than the specified thickness according to the standards, the focal position of the beam spot, formed by the beam from the objective lens, deviates from the recording surface of the medium toward the light source. To correct this error, the pattern of the light beam incident to the objective lens is changed to a slightly divergent light beam. By passing the divergent light beam through the objective lens, the spherical aberration due to the objective lens and the spherical aberration due to the deviation of the substrate thickness of the medium can be canceled each other. By this method, the beam spots with a proper size can be positioned on the recording surface of the medium in the focal conditions.

The spherical aberration correction method disclosed in Japanese Laid-Open Patent Application No.2000-30290 is effective in correcting the spherical aberration due to the deviation of the substrate thickness of the medium. However, in the case of the optical pickup device in which the sub-spot tracking control is performed, the positions of the sub-spots on the recording surface of the medium are shifted when the spherical aberration correction is performed. The tracking error signal that is produced based on the quantities of light of the reflection beams from the sub-spots of the medium is influenced by the shifting of the sub-spot positions, which causes the deterioration of the accuracy of the sub-spot tracking control.

In addition, when the multi-layer optical recording medium described above is accessed by the optical pickup device in which the sub-spot tracking control is performed, the positions of the sub-spots on the recording surface of the medium are shifted by not only the performance of the spherical aberration correction but also the location of the given one of the recording layers of the multi-layer medium from the medium surface. Also, the spherical aberration is varied depending on the location of the given one of the recording layers of the multi-layer medium from the medium surface. The tracking error signal that is produced based on the quantities of light of the reflection beams from the sub-spots of the medium is influenced by the shifting of the sub-spot positions, which causes the deterioration of the accuracy of the sub-spot tracking control.

SUMMARY OF THE INVENTION

An object of the present invention is to provide an improved optical pickup method in which the above-described problems are eliminated.

Another object of the present invention is to provide an optical pickup method which effectively prevents the deterioration of the accuracy of the sub-spot tracking control when the spherical aberration correction is performed to correct the spherical aberration due to the deviation of the substrate thickness of the medium.

Another object of the present invention is to provide an optical pickup device which effectively prevents the deterioration of the accuracy of the sub-spot tracking control when the spherical aberration correction is performed to correct the spherical aberration of the optical recording medium due to the deviation of the substrate thickness of the medium.

Another object of the present invention is to provide an optical information processing apparatus which effectively prevents the deterioration of the accuracy of the sub-spot tracking control when the spherical aberration correction is performed to correct the spherical aberration of the optical recording medium due to the deviation of the substrate thickness of the medium.

The above-mentioned objects of the present invention are achieved by an optical pickup method for accessing an optical recording medium, the medium including a transparent substrate and a recording surface on the substrate, the optical pickup method comprising the steps of: passing a light beam, emitted by a light source, through a grating unit to separate the emitted light beam into a 0th order diffracted beam and 1st order diffracted beams; passing the diffracted beams, sent from the grating unit, through an objective lens to focus the beams onto the recording surface of the medium through the substrate, so that a main spot is formed on the recording surface by the 0th order diffracted beam and sub-spots, interposing the main spot therebetween, are formed on the recording surface by the 1st order diffracted beams; receiving respective reflection beams from the main spot and the sub-spots of the medium to generate detection signals from the received reflection beams; changing a pattern of the beams incident to the objective lens to correct a spherical aberration due to a deviation of a thickness of the substrate of the medium; and moving the grating unit relative to the light source to cancel shifting of sub-spot positions on the recording surface due to the spherical aberration correction, in order to generate a proper tracking error signal.

The above-mentioned objects of the present invention are achieved by an optical pickup device for accessing an optical recording medium, the medium including a transparent substrate and a recording surface on the substrate, the optical pickup device comprising: a light source which emits a light beam; a grating unit which separates the light beam, emitted by the light source, into a 0th order diffracted beam and 1st order diffracted beams; an objective lens which focuses the diffracted beams, sent from the grating unit, onto the recording surface of the medium through the substrate, so that a main spot is formed on the recording surface by the 0th order diffracted beam and sub-spots, interposing the main spot therebetween, are formed on the recording surface by the 1st order diffracted beams; a reflection beam detector which receives reflection beams from the main spot and the sub-spots of the medium to generate detection signals from the received reflection beams; and a control unit which changes a pattern of the beams incident to the objective lens to correct a spherical aberration due to a deviation of a thickness of the substrate of the medium, and the control unit moving the grating unit relative to the light source to cancel shifting of sub-spot positions on the recording surface due to the spherical aberration correction, in order to generate a proper tracking error signal.

The above-mentioned objects of the present invention are achieved by an optical information processing apparatus in which an optical pickup device is provided to access an optical recording medium, the medium including a transparent substrate and a recording surface on the substrate, the optical pickup device comprising: a light source which emits a light beam; a grating unit which separates the light beam, emitted by the light source, into a 0th order diffracted beam and 1st order diffracted beams; an objective lens which focuses the diffracted beams, sent from the grating unit, onto the recording surface of the medium through the substrate, so that a main spot is formed on the recording surface by the 0th order diffracted beam and sub-spots, interposing the main spot therebetween, are formed on the recording surface by the 1st order diffracted beams; a reflection beam detector which receives reflection beams from the main spot and the sub-spots of the medium to generate detection signals from the received reflection beams; and a control unit which changes a pattern of the beams incident to the objective lens to correct a spherical aberration due to a deviation of a thickness of the substrate of the medium, and the control unit moving the grating unit relative to the light source to cancel shifting of sub-spot positions on the recording surface due to the spherical aberration correction, in order to generate a proper tracking error signal.

According to the optical pickup method and device of the present invention, the shifting of the sub-spot positions due to the performance of the spherical aberration correction is corrected by movement of the grating unit relative to the light source, so that the sub-spots with a proper pitch are positioned on the recording surface of the medium. Therefore, the optical pickup method and device of the present invention are effective in preventing the deterioration of the accuracy of the sub-spot tracking control when the spherical aberration correction is performed.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be provided of preferred embodiments of the present invention with reference to the accompanying drawings.

Figure 1:
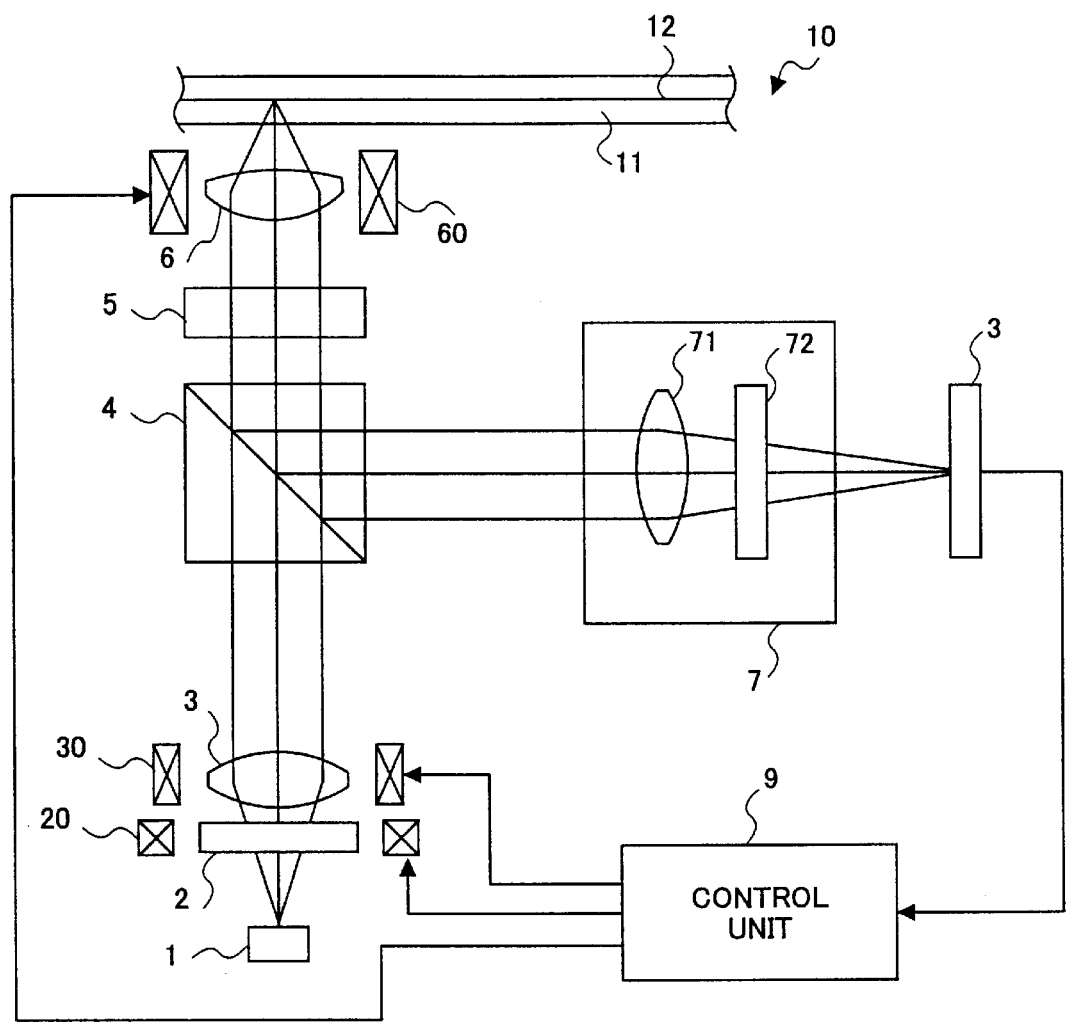
FIG. 1 is a diagram of a first preferred embodiment of the optical pickup device of the invention.

FIG. 1 shows a first preferred embodiment of the optical pickup device of the invention.

As shown in FIG. 1, the optical pickup device of the present embodiment generally includes a semiconductor laser 1, a diffraction grating unit 2, a collimate lens 3, a polarizing beam splitter 4, a quarter-wave plate 5, an objective lens 6, a detection unit 7, a photodetector unit 8, and a control unit 9. Further, in the optical pickup device of the present embodiment, a grating actuator 20, a collimate lens actuator 30, and an objective lens actuator 60 are provided. The grating actuator 20 is controlled to move the grating unit 2 in the direction of the optical axis perpendicular to the recording surface of the medium. The collimate lens actuator 30 is controlled to move the collimate lens 3 in the direction of the optical axis perpendicular to the recording surface of the medium. The objective lens actuator 60 is controlled to move the objective lens 6 in the direction of the optical axis perpendicular to the recording surface of the medium. The control unit 9 controls the respective actuators 20, 30 and 60 based on detection signals received from the photodetector unit 8.

In FIG. 1, reference numeral 10 denotes an optical recording medium. The optical recording medium 10 includes a transparent substrate 11 and a recording surface 12 provided on the substrate 11. In the present embodiment, the medium 10 is a single-layer optical recording medium. The optical pickup device of the present invention accesses the optical recording medium 10. Hereinafter, "access" means to record data onto the medium 10, reproduce data from the medium 10, or erase data on the medium 10 by irradiating the medium 10 with light.

In the optical pickup device of FIG. 1, the semiconductor laser 1 emits a divergent laser beam. The grating unit 2 separates the laser beam, emitted by the laser 1, into diffracted beams: the 0th order diffracted beam (m=0, where m indicates the order of diffraction) and the 1st order diffracted beams (m=±1).

When the grating unit 2 includes a single grating only, the grating unit 2 separates the emitted laser beam into three diffracted beams: the 0th order diffracted beam and the two 1st order diffracted beams. When the grating unit 2 includes two different gratings, the grating unit 2 separates the emitted laser beam into five diffracted beams: the 0th order diffracted beam and the four 1st order diffracted beams. Suppose that the grating unit 2 in the present embodiment includes a single grating only, for the sake of simplicity of description.

In the optical pickup device of FIG. 1, the collimate lens 3 converts the diffracted beams, sent by the grating unit 2, into collimated beams that are parallel to the direction of the optical axis perpendicular to the recording surface 12 of the medium 10. The collimated beams from the lens 3 pass through the polarizing beam splitter 4. The quarter-wave plate 5 converts the linearly polarized laser beams, which are passed through the beam splitter 4, into the circularly polarized laser beams. The objective lens 6 focuses the beams, sent by the quarter-wave plate 5, onto the recording surface 12 of the medium 10.

Accordingly, in the present embodiment, a main spot is formed on the recording surface 12 by the converging laser beam provided by the objective lens 6 from the 0th order diffracted beam, and a pair of sub-spots, interposing the main spot between them, are formed on the recording surface 12 by the converging laser beams provided by the objective lens 6 from the 1st order diffracted beams.

Further, in the optical pickup device of FIG. 1, the reflection beams from the main spot and the sub-spots of the medium 10 pass through the objective lens 6. The quarter-wave plate 5 converts the circularly polarized laser beams, which are passed through the objective lens 6, into the linearly polarized laser beams. The polarizing surface of the beam splitter 4 reflects the laser beams, sent by the quarter-wave plate 5, to the detection unit 7.

In the detection unit 7, a focusing lens 71 and a cylindrical lens 72 are provided. The focusing lens 71 converts the reflected laser beams, sent by the beam splitter 4, into converging laser beams. The cylindrical lens 72 cancels the astigmatism of the converging laser beams sent by the focusing lens 71, and focuses the laser beams onto the surface of the photodetector unit 8.

When the reflection beams from the medium 10 are received at the photodetector unit 8, the photodetector unit 8 outputs detection signals to the control unit 9, each of the detection signals indicating a quantity of light of a corresponding one of the received reflection beams. In the present embodiment, the photodetector unit 8 is divided into a main receiving section and two sub-receiving sections. The main receiving section is partitioned into four equal subsections, and the sub-sections receive part of the reflection beam from the main spot of the medium 10. The four sub-sections respectively output detection signals each indicating a quantity of light of the part of the reflection beam received. The sub-receiving sections respectively receive the reflection beams from the sub-spots of the medium 10, and output detection signals each indicating a quantity of light of a corresponding one of the received reflection beams.

In accordance with the astigmatism method, the control unit 9 generates a focusing error signal based on the detection signals output by the sub-sections of the main receiving section of the photodetector unit 8. In accordance with the push-pull method, the control unit 9 generates a tracking error signal based on the detection signals output by the sub receiving sections of the detection unit 8. Further, the control unit 9 generates a playback signal based on a sum of all of the detection signals output by the main receiving section and the sub-receiving sections of the detection unit 8.

In the optical pickup device of FIG. 1, the control unit 9 performs the focusing control and the tracking control by supplying the focusing error signal and the tracking error signal to the objective lens actuator 60. The actuator 60 is controlled to move the objective lens 6 in the direction of the optical axis thereof perpendicular to the recording surface 12 of the medium 10 in response to the focusing error signal and the tracking error signal. In the present embodiment, the focusing control and the tracking control are performed by the control unit 9 such that the main spot is always set in the focal condition on the track of the medium 10.

In the optical pickup device of FIG. 1, when the optical recording medium 10 is a single-layer type, the control unit 9 corrects the spherical aberration due to the deviation of the substrate thickness of the medium 10 by supplying a control signal to the collimate lens actuator 30. The actuator 30 is controlled to move the collimate lens 3 relative to the light source 1 so as to change the pattern of the light beams incident to the objective lens 6. The spherical aberration due to the deviation of the substrate thickness of the medium 10 is thus corrected by the movement of the collimate lens 3.

In the optical pickup device of FIG. 1, when the optical recording medium 10 is a multi-layer type, the control unit 9 corrects the spherical aberration due to the location of the given one of the recording layers of the multi-layer optical recording medium from the medium surface by supplying a control signal to the collimate lens actuator 30. The actuator 30 is controlled to move the collimate lens 3 relative to the light source 1 so as to change the pattern of the light beams incident to the objective lens 6. The spherical aberration due to the location of the given one of the recording layers of the multi-layer optical recording medium from the medium surface is thus corrected by the movement of the collimate lens 3.

When the spherical aberration correction is performed as described above, the location of the focal point of the sub-spots is changed in the direction of the optical axis perpendicular to the recording surface 12 of the medium 10. In order to eliminate the problem, in the optical pickup device of FIG. 1, the control unit 9 corrects the location of the grating unit 2 in the direction of the optical axis by supplying a control signal to the grating actuator 20. The actuator 20 is controlled to move the grating unit 2 relative to the light source 1. This movement of the grating unit 2 cancels the shifting of the sub-spot positions due to the spherical aberration correction, and the sub-spots with a proper pitch are positioned on the recording surface 12 of the medium 10. Therefore, the optical pickup device of the present embodiment is effective in preventing the deterioration of the accuracy of the sub-spot tracking control when the spherical aberration correction is performed.

Figure 2:
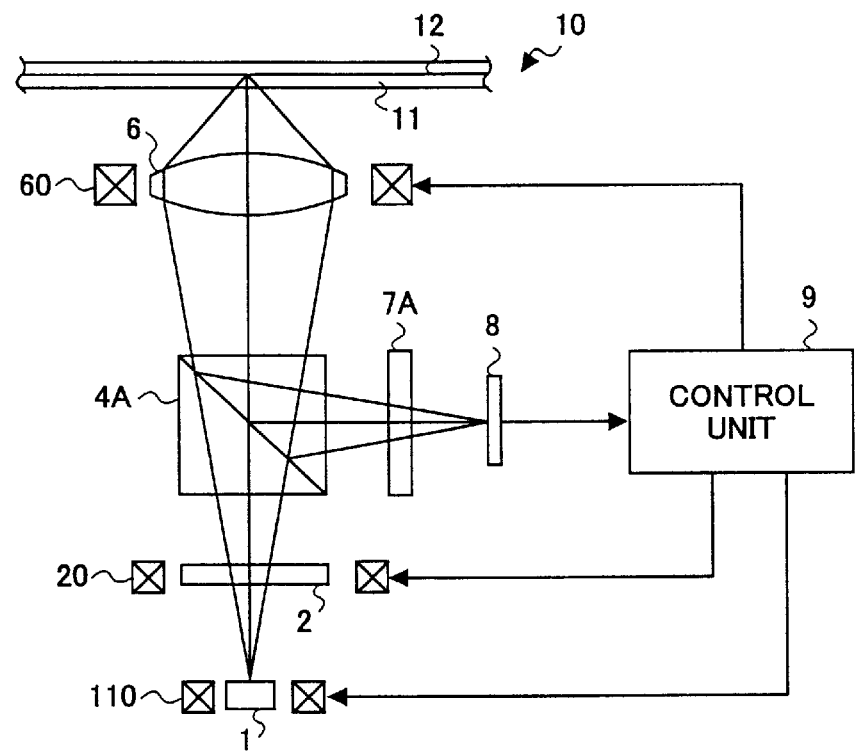
FIG. 2 is a diagram of a second preferred embodiment of the optical pickup device of the invention.

FIG. 2 shows a second preferred embodiment of the optical pickup device of the invention. In FIG. 2, the elements, which are essentially the same as corresponding elements in FIG. 1, are designated by the same reference numerals, and a description thereof will be omitted.

As shown in FIG. 2, the optical pickup device of the present embodiment generally includes the semiconductor laser 1, the diffraction grating unit 2, a beam splitter 4A, the objective lens 6, a detection unit 7A, the photodetector unit 8, and the control unit 9. Further, in the optical pickup device of the present embodiment, a laser actuator 110, the grating actuator 20, and the objective lens actuator 60 are provided. The laser actuator 20 is controlled to move the laser 1 in the direction of the optical axis perpendicular to the recording surface of the medium. The control unit 9 controls the respective actuators 110, 20 and 60 in accordance with the detection signals received from the photodetector unit 8.

In FIG. 2, the optical recording medium 10 is a single-layer recording medium including the transparent substrate 11 and the recording surface 12 on the substrate 11, which is the same as that in the previous embodiment of FIG. 1.

In the optical pickup device of FIG. 2, the semiconductor laser 1 emits a divergent laser beam. The grating unit 2 separates the laser beam, emitted by the laser 1, into diffracted beams: the 0th order diffracted beam (m=0) and the 1st order diffracted beams (m=±1).

When the grating unit 2 includes a single grating only, the grating unit 2 separates the emitted laser beam into three diffracted beams: the 0th order diffracted beam and the two 1st order diffracted beams. When the grating unit 2 includes two different gratings, the grating unit 2 separates the emitted laser beam into five diffracted beams: the 0th order diffracted beam and the four 1st order diffracted beams. It is supposed that the grating unit 2 in the present embodiment is the former type (the single grating), for the sake of simplicity of description.

In the optical pickup device of FIG. 2, the diffracted beams, sent by the grating unit 2, pass through the beam splitter 4A, and the laser beams passed through the beam splitter 4A remain in the diverging pattern. The objective lens 6 converts the diverging laser beams from the beam splitter 4A into converging laser beams and focuses the beams onto the recording surface 12 of the medium 10. In the present embodiment, a main spot is formed on the recording surface 12 by the converging laser beam provided by the objective lens 6 from the 0th order diffracted beam, and a pair of sub-spots, interposing the main spot between them, are formed on the recording surface 12 by the converging laser beams provided by the objective lens 6 from the 1st order diffracted beams.

Further, in the optical pickup device of FIG. 2, the reflection beams from the main spot and the sub-spots of the medium 10 pass through the objective lens 6. The reflection beams, passed through the objective lens 6, are in the converging pattern. The reflection surface of the beam splitter 4A reflects the converging laser beams, sent by the objective lens 6, to the detection unit 7A.

In the present embodiment, the detection unit 7A is a cylindrical lens which is provided to cancel the astigmatism of the converging laser beams sent by the beam splitter 4A. The cylindrical lens 7A focuses the laser beams onto the surface of the photodetector unit 8.

When the reflection beams from the medium 10 are received at the photodetector unit 8, the photodetector unit 8 outputs detection signals to the control unit 9, each of the detection signals indicating a quantity of light of a corresponding one of the received reflection beams. In the present embodiment, the photodetector unit 8 is essentially the same as that in the previous embodiment of FIG. 1.

Similar to the previous embodiment of FIG. 1, the control unit 9 in the present embodiment generates a focusing error signal based on the detection signals output by the sub-sections of the main receiving section of the photodetector unit 8. The control unit 9 generates a tracking error signal based on the detection signals output by the sub receiving sections of the detection unit 8. Further, the control unit 9 generates a playback signal based on a sum of all of the detection signals output by the main receiving section and the sub-receiving sections of the detection unit 8.

In the optical pickup device of FIG. 2, the control unit 9 performs the focusing control and the tracking control by supplying the focusing error signal and the tracking error signal to the objective lens actuator 60. The actuator 60 is controlled to move the objective lens 6 in the direction of the optical axis thereof perpendicular to the recording surface 12 of the medium 10 in response to the focusing error signal and the tracking error signal. In the present embodiment, the focusing control and the tracking control are performed by the control unit 9 such that the main spot is always set in the focal condition on the track of the medium 10.

In the optical pickup device of FIG. 2, the control unit 9 corrects the spherical aberration due to the deviation of the substrate thickness of the medium 10 by supplying a control signal to the laser actuator 110. The actuator 110 is controlled to move the laser 1 relative to the objective lens 6 so as to change the pattern of the light beams incident to the objective lens 6. The spherical aberration due to the deviation of the substrate thickness of the medium 10 is corrected by the movement of the laser 1. Similarly, when the optical recording medium 10 is a multi-layer type, the spherical aberration due to the location of the given one of the recording layers of the multi-layer optical recording medium from the medium surface is corrected by the movement of the laser 1.

As described earlier, the location of the focal point of the sub-spots is changed in the direction of the optical axis perpendicular to the recording surface 12 of the medium 10 when the spherical aberration correction is performed. In order to eliminate the problem, in the optical pickup device of FIG. 2, the control unit 9 controls the location of the grating unit 2 relative to the light source 1 by supplying a control signal to the grating actuator 20. The actuator 20 is controlled to move the grating unit 2 relative to the light source 1. This movement of the grating unit 2 cancels the shifting of the positions of the sub-spots due to the spherical aberration correction, and the sub-spots with a proper pitch can be positioned on the recording surface 12 of the medium 10. Therefore, the optical pickup device of the present embodiment is effective in preventing the deterioration of the accuracy of the sub-spot tracking control when the spherical aberration correction is performed.

In the above-described embodiment of FIG. 2, only the beam splitter 4A, the cylindrical lens 7A and the photodetector unit 8 form a reflection beam detector that outputs the detection signals from the reflection beams received from the medium 10. The quarter-wave plate 5, the polarizing beam splitter 4 and the focusing lens 71 as in the previous embodiment of FIG. 1 are unneeded to form the reflection beam detector. According to this embodiment, a small-size, inexpensive optical pickup device can be constructed.

Alternatively, the reflection beam detector that outputs the detection signals from the reflection beams received from the medium 10 may be constituted by the polarizing beam splitter 4, the quarter-wave plate 5, the cylindrical lens 7A and the photodetector unit 8. In such alternative embodiment, the beam splitter 4A is replaced with the polarizing beam splitter 4, and the quarter-wave plate 5 is additionally provided between the beam splitter 4 and the objective lens 6. According to this embodiment, the efficiency of the laser beams used by the optical pickup device can be increased.

In the above-described embodiment of FIG. 1, because of the divergence angle properties of the semiconductor laser 1, the collimated beams sent by the collimate lens 3 have an elliptic cross-section. When the necessity occurs, a beam profile converting prism may be provided to convert the elliptic cross-section of the collimated beams from the collimate lens 3 into a circular cross-section. By this configuration, the efficiency of beam coupling of the objective lens 6 can be increased.

In the above-described embodiment of FIG. 1, the spherical aberration correction to change the pattern of the laser beams incident to the objective lens 6 is performed by moving the collimate lens 3 relative to the light source 1 through the control of the collimate lens actuator 30. Alternatively, a different method of correction of the spherical aberration may be performed by using a spherical aberration correcting unit instead of the collimate lens actuator 30.

Figure 3:
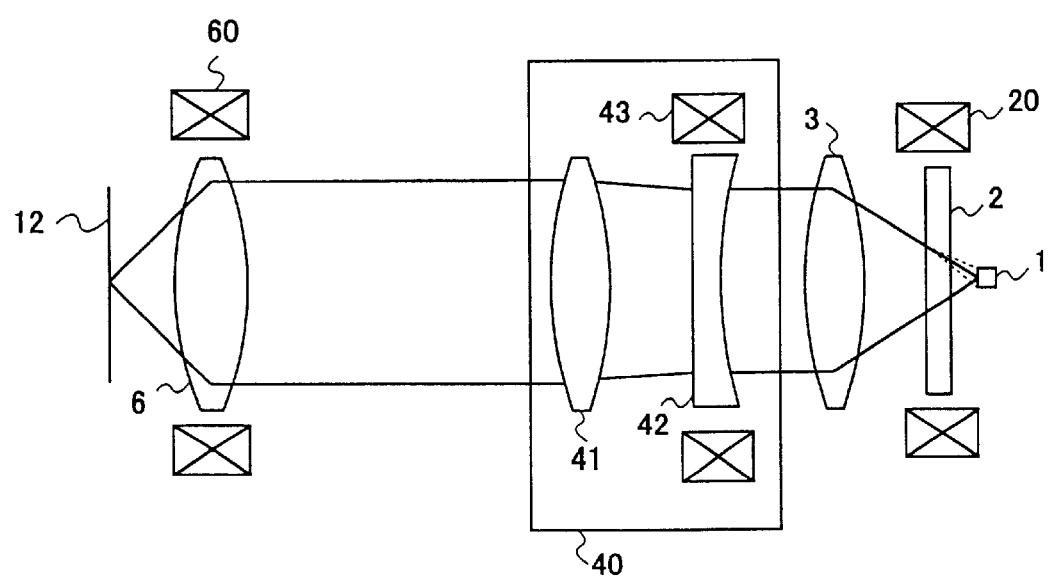
FIG. 3 is a diagram for explaining a method of correction of the spherical aberration performed by a spherical aberration correcting unit.
Figure 4:
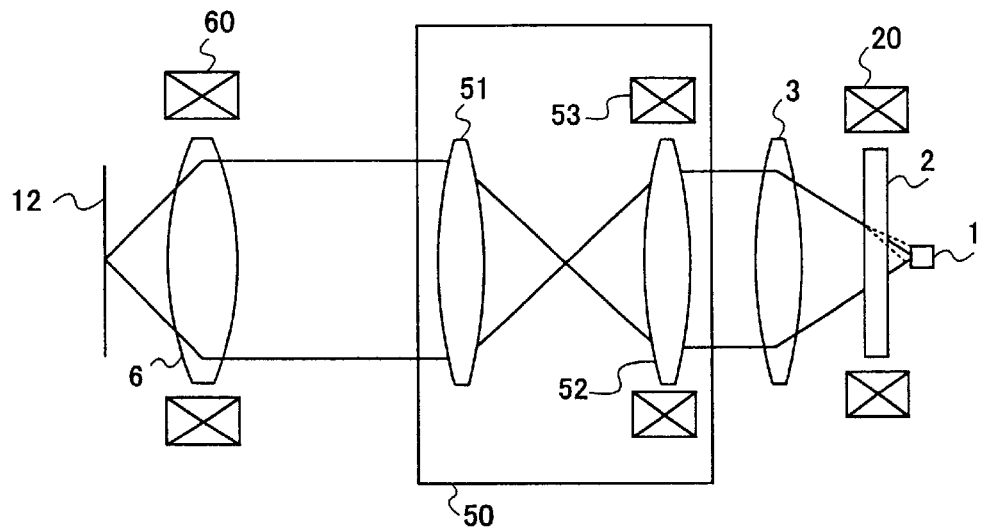
FIG. 4 is a diagram for explaining a method of correction of the spherical aberration performed by another spherical aberration correcting unit.

A description will now be provided of the spherical aberration correcting unit with reference to FIG. 3 and FIG. 4.

FIG. 3 shows a method of correction of the spherical aberration performed by using a spherical aberration correcting unit 40. In FIG. 3, the elements which are essentially the same as corresponding elements in FIG. 1 are designated by the same reference numerals, and a description thereof will be omitted.

As shown in FIG. 3, the spherical aberration correcting unit 40 is provided in the optical pickup device of FIG. 1, instead of the collimate lens actuator 30. The spherical aberration correcting unit 40 receives the collimated beams sent by the collimate lens 3, and sends the corrected beams to the objective lens 6.

In the present embodiment, the spherical aberration correcting unit 40 generally includes a positive lens 41, a negative lens 42, and a lens actuator 43. The positive lens 41 provides a converging power for the received laser beams, and the negative lens 42 provide a diverging power for the received laser beams. The lens actuator 43 is controlled by the control unit 9 to move the negative lens 42 relative to the light source 1 so as to change the pattern of the light beams incident to the objective lens 6. The spherical aberration due to the deviation of the substrate thickness of the medium 10 is thus corrected by the movement of the negative lens 42.

In the above-described embodiment, the lens actuator 43 is configured to move the negative lens 42 relative to the light source 1. Alternatively, the lens actuator 43 may be configured to move the positive lens 41 relative to the light source 1, or to move both the positive lens 41 and the negative lens 42 relative to the light source 1.

FIG. 4 shows a method of correction of the spherical aberration performed by using a spherical aberration correcting unit 50. In FIG. 4, the elements which are essentially the same as corresponding elements in FIG. 1 are designated by the same reference numerals, and a description thereof will be omitted.

As shown in FIG. 4, the spherical aberration correcting unit 50 is provided in the optical pickup device of FIG. 1, in place of the collimate lens actuator 30. The spherical aberration correcting unit 50 receives the collimated beams sent by the collimate lens 3, and delivers the corrected laser beams to the objective lens 6.

In the present embodiment, the spherical aberration correcting unit 50 generally includes a positive lens 51, a positive lens 52, and a lens actuator 53. The positive lens 51 converts the collimated beams from the collimate lens 3 into converging beams, and the positive lens 52 converts the converging beams from the positive lens 52 into parallel beams. The lens actuator 53 is controlled by the control unit 9 to move the positive lens 52 relative to the light source 1 so as to change the pattern of the light beams incident to the objective lens 6. The spherical aberration due to the deviation of the substrate thickness of the medium 10 is thus corrected by the movement of the positive lens 52.

In the above embodiment, the lens actuator 53 is configured to move the positive lens 52 relative to the light source 1. Alternatively, the lens actuator 53 may be configured to move the positive lens 51 relative to the light source 1, or to move both the positive lens 51 and the positive lens 52 relative to the light source 1.

Figure 5A:
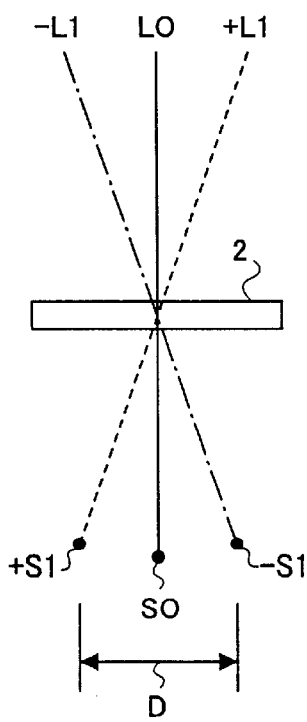
FIG. 5A and FIG. 5B are diagrams for explaining a method of changing the positions of the sub-spots by movement of the grating unit.
Figure 5B:
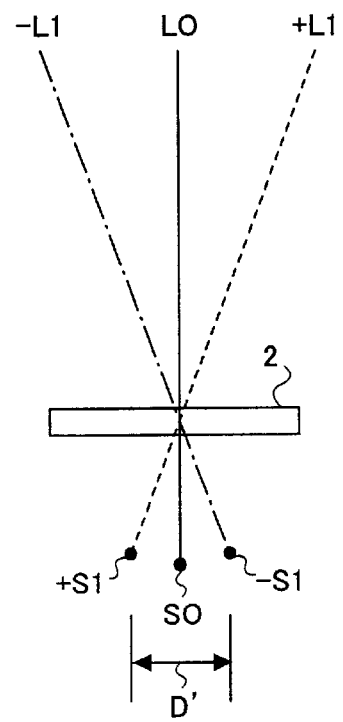

FIG. 5A and FIG. 5B show a method of changing the sub-spot positions by movement of the grating unit 2.

As described above with reference to FIG. 1 or FIG. 2, in order to correct the shifting of the sub-spot positions caused by the spherical aberration correction, the grating unit 2 is moved relative to the light source. For the sake of convenience, suppose that the grating unit 2 in the present embodiment includes a single grating only.

In FIG. 5A, the grating unit 2 separates the laser beam, emitted from an actual emission point S0 of the laser light source, into the 0th order diffracted beam L0 and the 1st order diffracted beams +L1 and −L1. These diffracted beams from the grating unit 2 are incident to the objective lens 6. When viewed from the objective lens 6, the diffracted beam +L1 is a laser beam sent from a virtual emission point +S1, and the diffracted beam −L1 is a laser beam sent from a virtual emission point −S1, as shown in FIG. 5A.

The main spot and the sub-spots, formed on the recording surface of the medium, are images of the actual emission point S0 and the virtual emission points +S1 and −S1. Hence, the distance between the sub-spots on the recording surface depends on the magnification provided by the optical systems of the optical pickup device and on the distance D between the virtual emission points +S1 and −S1.

In FIG. 5B, the grating unit 2 is moved along the optical axis closer to the light source from the previous position of the grating unit 2 in FIG. 5A. In this case, as the grating unit 2 gets closer to the light source, the previous distance D between the virtual emission points +S1 and −S1 is reduced to a distance D' as shown in FIG. 5B. Hence, the distance between the sub-spots on the recording surface is also reduced in accordance with the distance D'.

According to the method of changing the sub-spot positions in FIG. 5A and FIG. 5B, when the grating unit 2 gets closer to the light source the distance between the sub-spots on the recording surface is decreased, and when the grating unit 2 gets farther from the light source the distance between the sub-spots on the recording surface is increased.

Figure 6A:
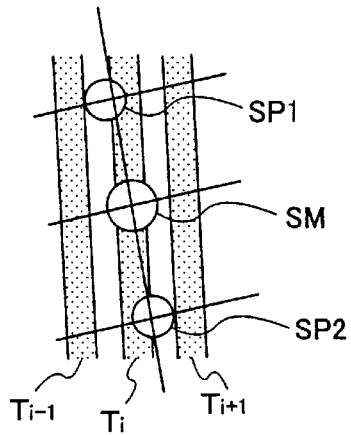
FIG. 6A and FIG. 6B are diagrams for explaining a condition of the optical pickup device of the present invention in which the sub-spots with a proper pitch are positioned.
Figure 6B:
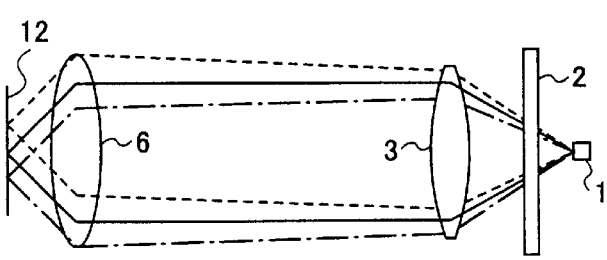

FIG. 6A and FIG. 6B show a condition of the optical pickup device of the present invention in which the sub-spots with a proper pitch are positioned on the recording surface.

In FIG. 6A, $T_i$, $T_{i-1}$ and $T_{i+1}$ indicate the tracks of the optical recording medium that are adjacent to each other, SM indicates the main spot that is formed on the recording surface of the medium by the 0th order diffracted beam (m=0), and SP1 and SP2 indicate the sub-spots that are formed on the recording surface of the medium by the 1st order diffracted beams (m=±1). FIG. 6B shows a condition of the optical pickup device in which the sub-spots with a proper pitch are positioned as in FIG. 6A.

As shown in FIG. 6A, the sub-spots SP1 and SP2 with the proper pitch are positioned on the recording surface 12. The center of the main spot SM is positioned at the center of the track $T_i$. The pitch of the sub-spots SP1 and SP2 in the transverse direction matches with the width of the track $T_i$. The center of the sub-spot SP1 on the left side of the main spot SM lies at the left-side edge of track $T_i$ and the center of the sub-spot SP2 on the right side of the main spot SM lies at the right-side edge of the track $T_i$ of the medium. In the optical pickup device, a tracking error signal is generated based on the difference between the quantities of light of the reflection beams from the sub-spots of the medium. The tracking error signal, which is generated when the sub-spots are positioned as in FIG. 6A, has the maximum amplitude. The optical pickup device in this condition provides good tracking control. The positions of the sub-spots SP1 and SP2 shown in FIG. 6A will be referred to as the proper positions.

Figure 6C:
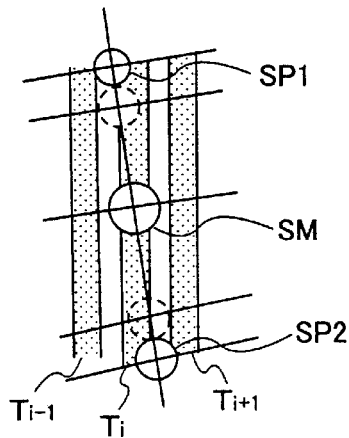
FIG. 6C and FIG. 6D are diagrams for explaining the shifting of the sub-spot positions due to the spherical aberration correction.
Figure 6D:
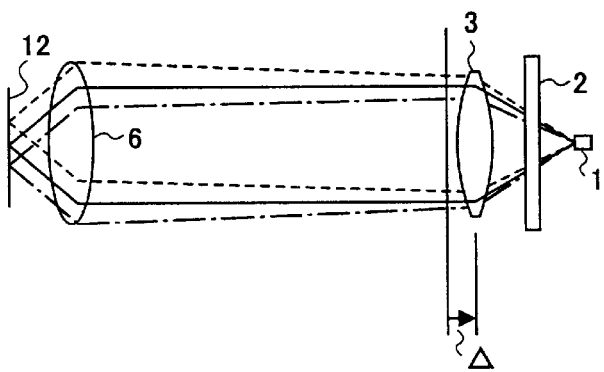

In the above-described embodiment of FIG. 1, in order to correct the spherical aberration due to the deviation of the substrate thickness of the medium, the collimate lens 3 is moved relative to the light source 1 by using the actuator 30. FIG. 6C and FIG. 6D show the shifting of the sub-spot positions when the spherical aberration correction is performed.

As shown in FIG. 6D, the collimate lens 3 is moved closer to the light source 1 by a displacement Δ along the optical axis. The pattern of the laser beams incident to the objective lens 6 is changed by this movement of the collimate lens 3, in order to correct the spherical aberration due to the deviation of the substrate thickness of the medium. In the example of FIG. 6D, the magnification provided by the collimate lens 3 and the objective lens 6 is increased after the movement of the collimate lens 3 from that before the movement of the collimate lens 3. For this reason, the positions of the sub-spots SP1 and SP2 on the recording surface are shifted to those indicated by the solid lines from the proper positions indicated by the dotted lines in FIG. 6C. In the example of FIG. 6C, the distance between the sub-spots SP1 and SP2 is increased from the previous distance at the proper positions. The center of the sub-spot SP1 deviates from the left-side edge of the track $T_i$ and the center of the sub-spot SP2 deviates from the right-side edge of the track $T_i$ of the medium. The amplitude of the tracking error signal, which is generated when the sub-spots are positioned as in FIG. 6C, is decreased significantly, which causes the deterioration of the accuracy of the sub-spot tracking control.

Figure 6E:
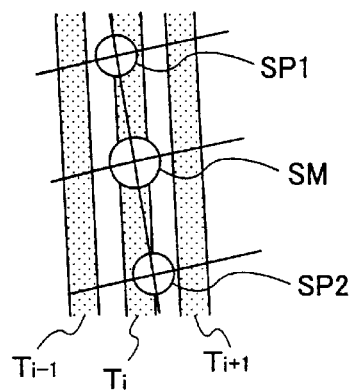
FIG. 6E and FIG. 6F are diagrams for explaining a method of correcting the shifting of the sub-spot positions by a translational movement of the grating unit.
Figure 6F:
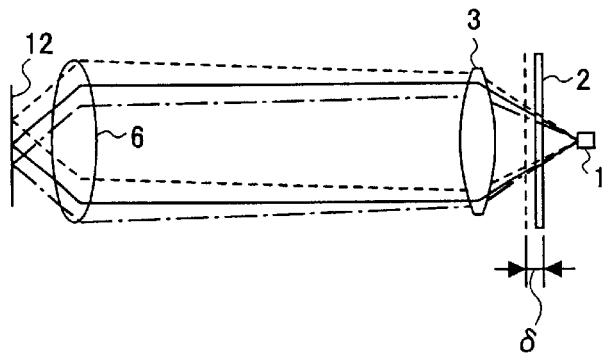

FIG. 6E and FIG. 6F show a method of correcting the shifting of the sub-spot positions by a translational movement of the grating unit 2.

As shown in FIG. 6F, in order to correct the shifting of the sub-spot positions on the recording surface of the medium, the grating unit 2 is moved closer to the light source 1 by a displacement $\delta$ along the optical axis. By this movement of the grating unit 2, the distance between the virtual emission points for the sub-spots SP1 and SP2 is reduced as described above with reference to FIG. 5B, and the distance between the sub-spots SP1 and SP2 on the recording surface of the medium is reduced as shown in FIG. 6E.

In the example of FIG. 6E, the sub-spots SP1 and SP2 with the proper pitch are again positioned on the recording surface 12. The tracking error signal, which is generated when the sub-spots are positioned as in FIG. 6E, has the maximum amplitude. The optical pickup device in this condition provides good tracking control.

According to the method in FIG. 6D and FIG. 6F, the relationship between the displacement $\Delta$ of the collimate lens 3 being moved relative to the light source 1 and the displacement $\delta$ of the grating unit 2 being moved relative to the light source 1 is determined based on the experimental results. In the present embodiment, an experimentally obtained map which defines the relationship between the displacement $\Delta$ and the displacement $\delta$ is stored in a memory of the control unit 9 of the optical pickup device in the form of a table or a calculation formula.

In the optical pickup device of the above-described embodiment, the displacement $\Delta$ of the collimate lens 3 which is moved relative to the light source 1 is first calculated in order for correcting the spherical aberration due to the deviation of the substrate thickness of the medium, and the displacement $\delta$ of the grating unit 2 is then determined by reading the stored map in response to the displacement $\Delta$. The control unit 9 controls the actuator 30 based on the displacement $\Delta$, and controls the actuator 20 based on the displacement $\delta$.

In the above-mentioned embodiment, the shifting of the sub-spot positions due to the spherical aberration correction is canceled by a translational movement of the grating unit 2 in the direction of the optical axis of the light source 1. The present invention is not limited to this embodiment. Alternatively, the shifting of the sub-spot positions may be canceled by a rotational movement of the grating unit 2 around the optical axis of the light source 1.

FIG. 7A, FIG. 7B, FIG. 7C and FIG. 7D show a method of correcting the shifting of the sub-spot positions by a rotational movement of the grating unit 2 around the optical axis of the light source 1. Suppose that the grating unit 2 in the present embodiment includes a single grating only, for the sake of simplicity of description.

Figure 7A:
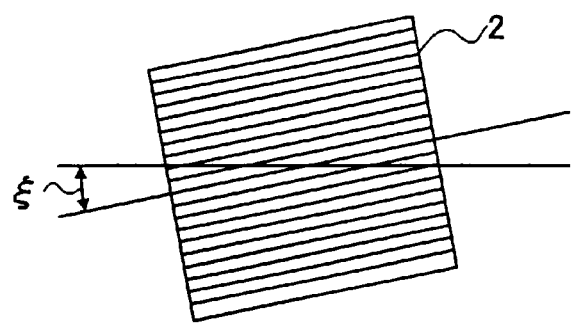
FIG. 7A, FIG. 7B, FIG. 7C and FIG. 7D are diagrams for explaining a method of correcting the shifting of the sub-spot positions by a rotational movement of the grating unit.
Figure 7B:
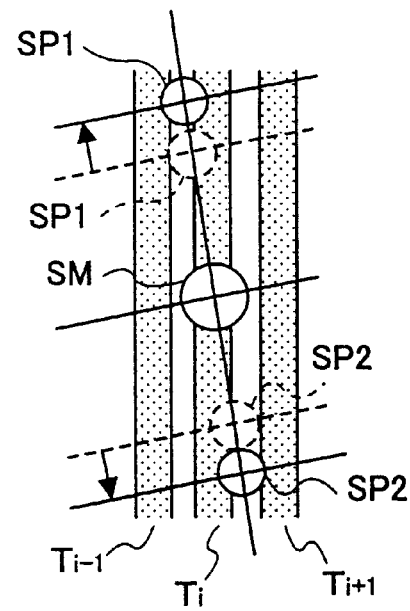
Figure 7C:
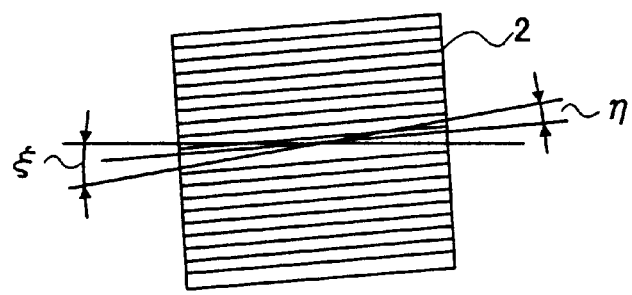
Figure 7D:
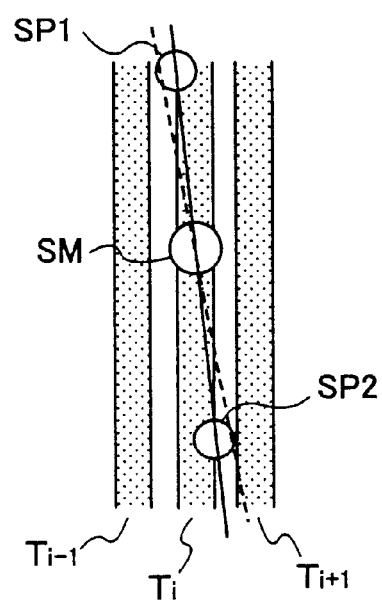

In FIG. 7B and FIG. 7D, $T_i$, $T_{i-1}$ and $T_{i+1}$ indicate the tracks of the optical recording medium that are adjacent to each other, SM indicates the main spot that is formed on the recording surface of the medium by the 0th order diffracted beam (m=0), and SP1 and SP2 indicate the sub-spots that are formed on the recording surface of the medium by the 1st order diffracted beams (m=±1).

FIG. 7A is a view of the grating unit 2 from the side of the light source 1 along the optical axis of the light source 1. As shown in FIG. 7A, the grating unit 2 has a pattern of grating (parallel notches or scratches) which is inclined at a predetermiend angle $\xi$ to the horizontal direction. This angle $\xi$ is specified according to the standards. The 0th order and 1st order diffracted beams from the grating unit 2 are separately drawn in a direction perpendicular to the inclined direction of the grating pattern. As shown in FIG. 7B, the main spot SP and the sub-spots SP1 and SP2 are formed on the recording surface along the inclined line.

When the spherical aberration due to the deviation of the substrate thickness of the medium remains uncorrected, the sub-spots SP1 and SP2 are positioned on the recording surface as indicated by the dotted lines in FIG. 7B. The optical pickup device in this condition provides good tracking control.

When the spherical aberation is corrected by movement of the collimate lens 3 relative to the light source 1, the positions of the sub-spots SP1 and SP2 on the recording surface are shifted to the positions indicated by the solid lines in FIG. 7B. In this condition, the amplitude of the tracking error signal, which is generated when the sub-spot positions are shifted as indicated by the dotted lines, becomes significantly low, and the accuracy of the sub-spot tracking control deteriorates.

As shown in FIG. 7B, the distance between the sub-spots SP1 and SP2 is increased from the previous distance at the proper positions. The center of the sub-spot SP1 deviates from the left-side edge of the track $T_i$ and the center of the sub-spot SP2 deviates from the right-side edge of the track $T_i$ of the medium. In order to correct the shifting of the sub-spot positions on the recording surface of the medium, it is necessary to move the center of the sub-spot SP1 closer to the left-side edge of the track $T_i$ and move the center of the sub-spot SP2 closer to the right-side edge of the track $T_i$.

In the present embodiment, as shown in FIG. 7C, the grating unit 2 is rotated clockwise by a rotational angle $\eta$ around the optical axis of the light source 1 so as to displace the sub-spots SP1 and SP2 to the proper positions. The rotational angle $\eta$ can be obtained based on the displacement of the collimate lens 3 relative to the light source 1. By the rotational movement of the grating unit 2, the sub-spots SP1 and SP2 on the recording surface are rotated clockwise around the position of the main spot SM as indicated in FIG. 7D. Hence, the shifting of the sub-spot positions is corrected to the proper positions on the recording surface, but the distance between the sub-spots SP1 and SP2 on the recording surface remains unchanged as shown in FIG. 7D.

In the example of FIG. 7D, the sub-spots SP1 and SP2 are again properly positioned on the recording surface 12. The tracking error signal, which is generated when the sub-spots are positioned as in FIG. 7D, has the maximum amplitude. The optical pickup device in this condition provides good tracking control.

According to the method in FIG. 7C and FIG. 7D, the relationship between the displacement $\Delta$ of the collimate lens 3 being moved relative to the light source 1 and the rotational angle $\eta$ of the grating unit 2 being rotated around the optical axis of the light source 1 is determined based on the experimental results. In the present embodiment, an experimentally obtained map which defines the relationship between the displacement Δ and the rotational angle η is stored in a memory of the control unit 9 of the optical pickup device in the form of a table or a calculation formula.

In the optical pickup device of the above-described embodiment, the displacement Δ of the collimate lens 3 which is moved relative to the light source 1 is first calculated in order for correcting the spherical aberration due to the deviation of the substrate thickness of the medium, and the rotational angle η of the grating unit 2 is then determined by reading the stored map in response to the displacement Δ. The control unit 9 controls the actuator 30 based on the displacement Δ, and controls the actuator 20 based on the rotational angle η.

In the above-described embodiment, a displacement of the grating unit 2 to be moved relative to the light source 1 is determined based on a displacement of the collimate lens 3 being moved relative to the light source 1. The method of determining a displacement of the grating unit 2 according to the present invention is not limited to this embodiment. Alternatively, another method of determining a displacement of the grating unit 2 may be used for the optical pickup device of the present invention.

Figure 8A:
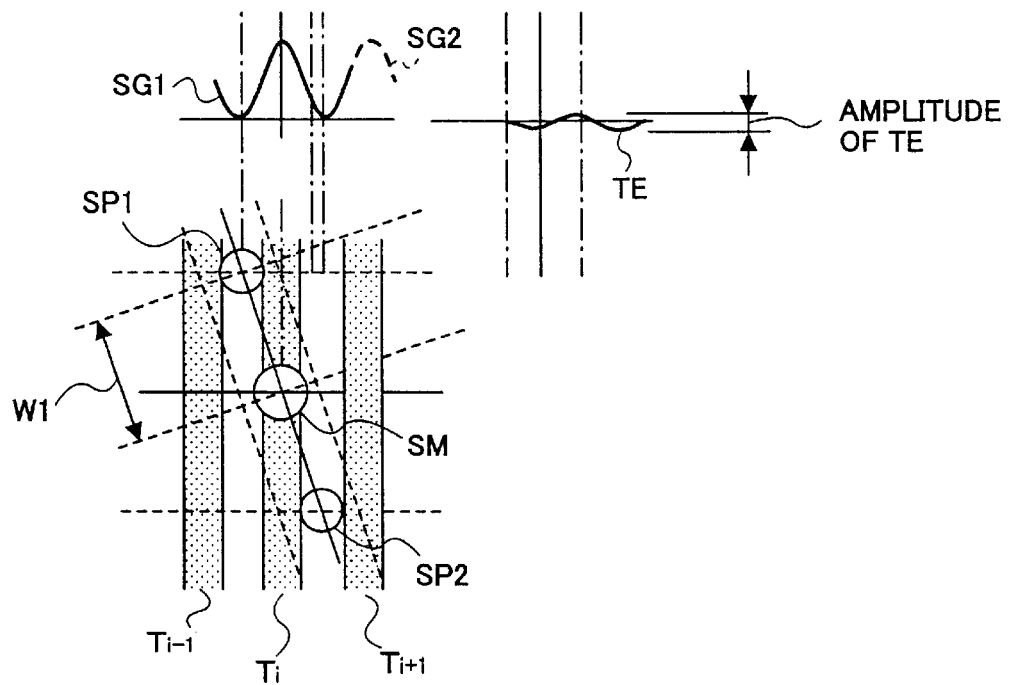
FIG. 8A and FIG. 8B are diagrams for explaining a change of the sub-spot positions by a translational movement of the grating unit, and a corresponding change of the tracking error signal.
Figure 8B:
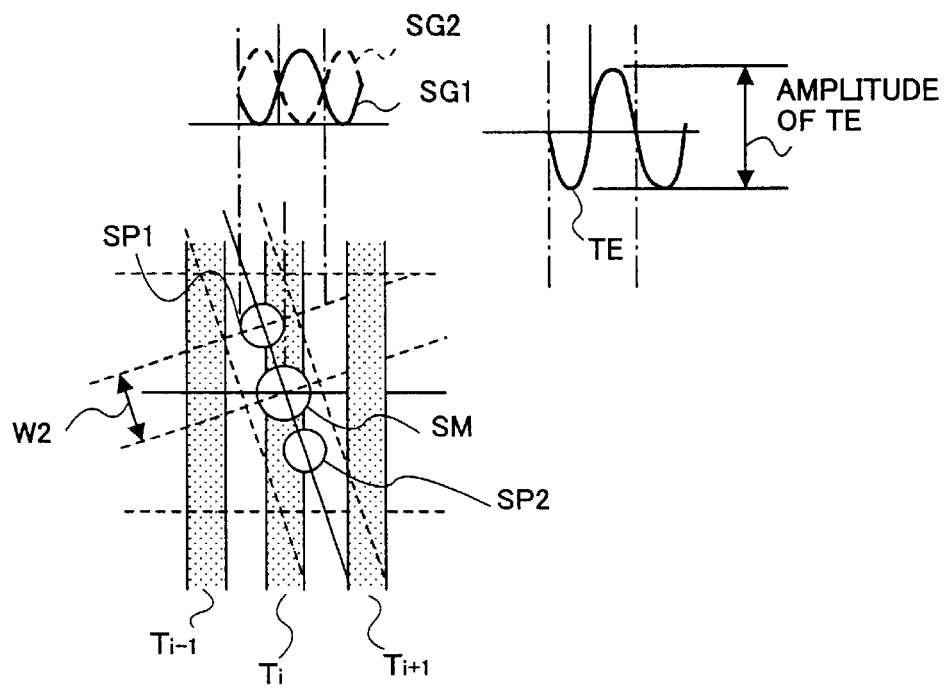

FIG. 8A and FIG. 8B show a change of the sub-spot positions by a translational movement of the grating unit 2, and a corresponding change of the tracking error signal TE.

In the present embodiment, a tracking error signal TE is generated based on a difference between the quantities of light of the reflection beams received from the sub-spots SP1 and SP2 of the medium, and a translational movement of the grating unit 2 relative to the light source 1 is performed in the optical pickup device of FIG. 1 to allow the tracking error signal TE to have the maximum amplitude.

The diagram at the bottom portion of FIG. 8A indicates a condition of the main spot SM and the sub-spots SP1 and SP2 on the recording surface after the spherical aberration due to the deviation of the substrate thickness of the medium is corrected. As described earlier, because of the spherical aberration correction, the distance between the main spot SM and the sub-spot SP1 (or the sub-spot SP2) is increased to W1. The center of the sub-spot SP1 deviates from the left-side edge of the track $T_i$ and the center of the sub-spot SP2 deviates from the right-side edge of the track $T_i$. In the example of FIG. 8A, the center of the sub-spot SP1 is interposed between the adjacent tracks $T_{i-1}$ and $T_i$ and the center of the sub-spot SP2 is interposed between the adjacent tracks $T_i$ and $T_{i+1}$, and the reflection beams SG1 and SG2, received from the sub-spots SP1 and SP2 of the recording medium, have the same phase (the minimum intensity) as indicated at the upper left portion of FIG. 8A.

If the tracking error signal TE is generated in this condition based on the difference between the quantities of light of the reflection beams SG1 and SG2, the amplitude of the tracking error signal TE in this condition is very small, as indicated at the upper right portion of FIG. 8A. It is difficult to provide good tracking control.

The diagram at the bottom portion of FIG. 8B indicates a condition of the main spot SM and the sub-spots SP1 and SP2 on the recording surface after the translational movement of the grating unit 2 relative to the light source 1 is performed in the optical pickup device of FIG. 1 to allow the tracking error signal TE to have the maximum amplitude. The distance between the main spot SM and the sub-spot SP1 (or the sub-spot SP2) is decreased from W1 to W2. The center of the sub-spot SP1 lies on the left-side edge of the track $T_i$ and the center of the sub-spot SP2 lies on the right-side edge of the track $T_i$. In the example of FIG. 8B, both the centers of the sub-spots SP1 and SP2 are located at the edges of the track $T_i$ on which the main spot SM is formed, and the reflection beams SG1 and SG2, received from the sub-spots SP1 and SP2 of the recording medium, have the opposite phases as indicated at the upper left portion of FIG. 8B.

If the tracking error signal TE is generated in this condition based on the difference between the quantities of light of the reflection beams SG1 and SG2, the amplitude of the tracking error signal TE in this condition is the maximum, as indicated at the upper right portion of FIG. 8B. It is possible to provide good tracking control.

As can be readily understood from the foregoing, if the distance between the main spot and one of the sub-spots is suitably decreased from W1 to W2, the amplitude of the tracking error signal TE is gradually increased to the maximum amplitude. Namely, in the present embodiment, the translational movement of the grating unit 2 relative to the light source 1 is continuously performed by controlling the actuator 20, and when the maximum amplitude of the tracking error signal TE is reached, the translational movement of the grating unit 2 relative to the light source 1 is stopped. According to the present embodiment, the desired displacement δ of the translational movement of the grating unit 2 (as shown in FIG. 6F) is obtained in this manner so that the condition of the beam spots shown in FIG. 8B can be achieved. Therefore, the optical pickup device of the present embodiment is effective in preventing the deterioration of the accuracy of the sub-spot tracking control due to the spherical aberration correction.

Figure 9A:
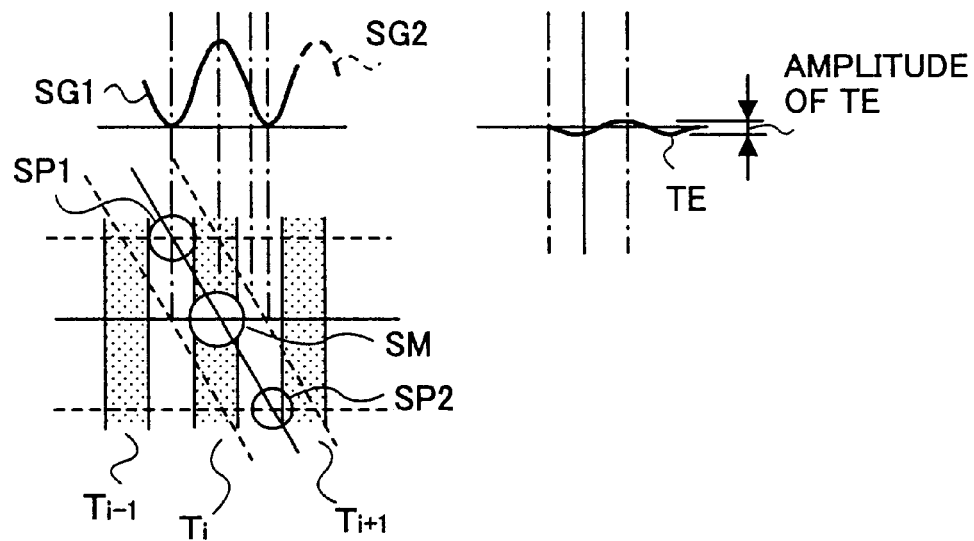
FIG. 9A and FIG. 9B are diagrams for explaining a change of the sub-spot positions by a rotational movement of the grating unit, and a corresponding change of the tracking error signal.
Figure 9B:
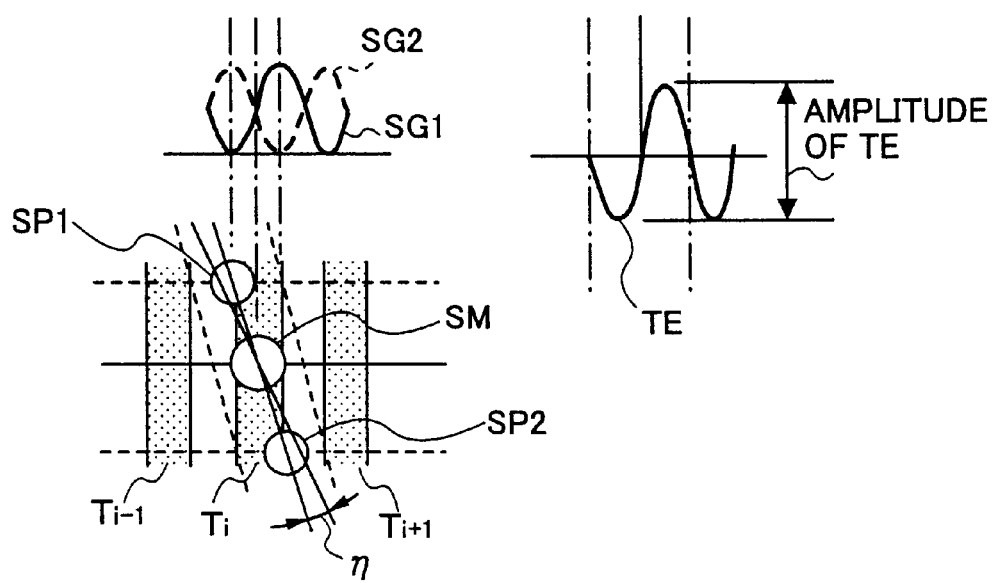

FIG. 9A and FIG. 9B show a change of the sub-spot positions by a rotational movement of the grating unit, and a corresponding change of the tracking error signal.

In the present embodiment, a tracking error signal TE is generated based on a difference between the quantities of light of the reflection beams received from the sub-spots SP1 and SP2 of the medium, and a rotational movement of the grating unit 2 relative to the light source 1 is performed in the optical pickup device of FIG. 1 to allow the tracking error signal TE to have the maximum amplitude.

The diagram at the bottom portion of FIG. 9A indicates a condition of the main spot SM and the sub-spots SP1 and SP2 on the recording surface after the spherical aberration due to the deviation of the substrate thickness of the medium is corrected. As described earlier, because of the spherical aberration correction, the distance between the main spot SM and the sub-spot SP1 (or the sub-spot SP2) is increased. The center of the sub-spot SP1 deviates from the left-side edge of the track $T_i$ and the center of the sub-spot SP2 deviates from the right-side edge of the track $T_i$. In the example of FIG. 9A, the center of the sub-spot SP1 is interposed between the adjacent tracks $T_{i-1}$ and $T_i$ and the center of the sub-spot SP2 is interposed between the adjacent tracks $T_i$ and $T_{i+1}$, and the reflection beams SG1 and SG2, received from the sub-spots SP1 and SP2 of the recording medium, have the same phase (the minimum intensity) as indicated at the upper left portion of FIG. 9A.

If the tracking error signal TE is generated in this condition based on the difference between the quantities of light of the reflection beams SG1 and SG2, the amplitude of the tracking error signal TE in this condition is very small, as indicated at the upper right portion of FIG. 9A. It is difficult to provide good tracking control.

The diagram at the bottom portion of FIG. 9B indicates a condition of the main spot SM and the sub-spots SP1 and SP2 on the recording surface after the rotational movement of the grating unit 2 relative to the light source 1 is performed in the optical pickup device of FIG. 1 to allow the tracking error signal TE to have the maximum amplitude. The positions of the sub-spots SP1 and SP2 are rotated clockwise by a rotational angle η around the center of the main spot SM. The center of the sub-spot SP1 lies on the left-side edge of the track $T_i$ and the center of the sub-spot SP2 lies on the right-side edge of the track $T_i$. In the example of FIG. 9B, both the centers of the sub-spots SP1 and SP2 are located at the edges of the track $T_i$ on which the main spot SM is formed, and the reflection beams SG1 and SG2, received from the sub-spots SP1 and SP2 of the recording medium, have the opposite phases as indicated at the upper left portion of FIG. 9B.

If the tracking error signal TE is generated in this condition based on the difference between the quantities of light of the reflection beams SG1 and SG2, the amplitude of the tracking error signal TE in this condition is the maximum, as indicated at the upper right portion of FIG. 9B. It is possible to provide good tracking control.

As can be readily understood from the foregoing, if the positions of the sub-spots SP1 and SP2 are suitably rotated around the center of the main spot SM, the amplitude of the tracking error signal TE is gradually increased to the maximum amplitude. Namely, in the present embodiment, the rotational movement of the grating unit 2 relative to the light source 1 is continuously performed by controlling the actuator 20, and when the maximum amplitude of the tracking error signal TE is reached, the rotational movement of the grating unit 2 relative to the light source 1 is stopped. According to the present embodiment, the desired angle η of the rotation of the grating unit 2 as shown in FIG. 7C is obtained in this manner so that the condition of the beam spots shown in FIG. 9B can be achieved. Therefore, the optical pickup device of the present embodiment is effective in preventing the deterioration of the accuracy of the sub-spot tracking control due to the spherical aberration correction.

Figure 10A:
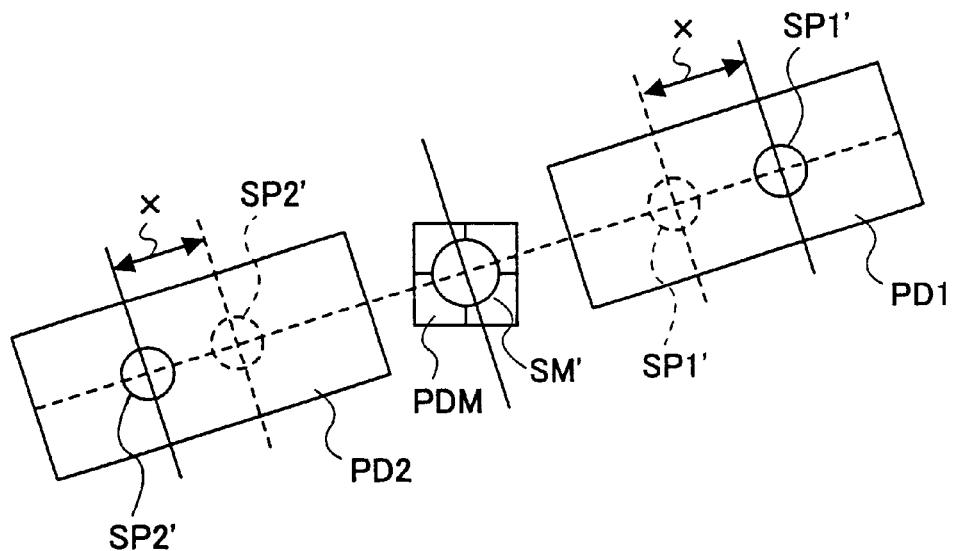
FIG. 10A and FIG. 10B are diagrams for explaining a reflection beam receiving section of a photodetector unit.
Figure 10B:
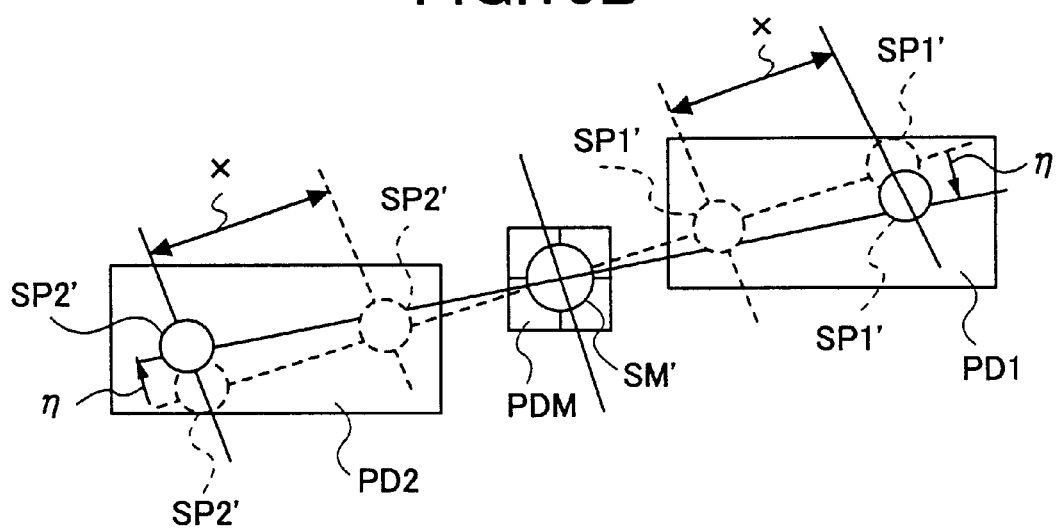

FIG. 10A and FIG. 10B show a reflection beam receiving section of the photodetector unit 8 in the optical pickup device of the present invention.

In the present embodiment, the grating unit 2 separates the emitted laser beam into the 0th order diffracted beam and the two 1st order diffracted beams. As shown in FIG. 10A and FIG. 10B, the reflection beam receiving section of the photodetector unit 8 includes a main receiving section PDM, a sub-receiving section PD1, and a sub-receiving section PD2. The main receiving section PDM receives the reflection beam (which forms a main spot SM' on the PDM surface) from the main spot SM of the recording medium. The sub-receiving sections PD1 and PD2 respectively receive the reflection beams (which form sub-spots SP1' and SP2' on the PD1 and PD2 surfaces) from the sub-spots SP1 and SP2 of the recording medium.

The example of FIG. 10A indicates a condition of the beam spots SM', SP1' and SP2' on the reflection beam receiving section of the photodetector unit 8 when the translational movement of the grating unit 2 relative to the light source 1 is performed. As shown in FIG. 10A, the photodetector unit 8 of the present embodiment is configured so that the sub-receiving sections PD1 and PD2 are capable of receiving the respective reflection beams from the sub-spots SP1 and SP2 of the recording medium, regardless of whether the positions of the sub-spots SP1' and SP2' are shifted (as indicated by the arrows X in FIG. 10A) due to the spherical aberration correction or the movement of the grating unit 2.

The example of FIG. 10B indicates a condition of the beam spots SM', SP1' and SP2' on the reflection beam receiving section of the photodetector unit 8 when the rotational movement of the grating unit 2 relative to the light source 1 is performed. As shown in FIG. 10B, the photodetector unit 8 of the present embodiment is configured so that the sub-receiving sections PD1 and PD2 are capable of receiving the respective reflection beams from the sub-spots SP1 and SP2 of the recording medium, regardless of whether the positions of the sub-spots SP1' and SP2' are shifted (as indicated by the arrows X or η in FIG. 10B) due to the spherical aberration correction or the movement of the grating unit 2.

As shown in FIG. 10A and FIG. 10B, the main receiving section PDM of the photodetector unit 8 is partitioned into four equal sub-sections, and the four sub-sections respectively output detection signals each indicating a quantity of light of one fourth of the reflection beam received from the main spot SM of the recording medium. As described earlier, in accordance with the astigmatism method, the control unit 9 generates a focusing error signal based on the detection signals output by the sub-sections of the main receiving section PDM of the photodetector unit 8.

In the above-described embodiments, the grating unit 2 includes a single grating only, and the grating unit 2 separates the emitted laser beam into three diffracted beams: one 0th order diffracted beam and two 1st order diffracted beams. The main spot and the two sub-spots are formed on the recording surface of the medium 10.

The present invention is not limited to the above descriptions. Alternatively, the grating unit 2 may include two different gratings. In such alternative embodiment, the grating unit 2 separates the emitted laser beam into five diffracted beams: one 0th order diffracted beam and four 1st order diffracted beams. The main spot and the four sub-spots are formed on the recording surface of the medium 10.

A description will now be given of such alternative embodiment of the optical pickup device of the invention, with reference to FIG. 11A and FIG. 11B.

Figure 11A:
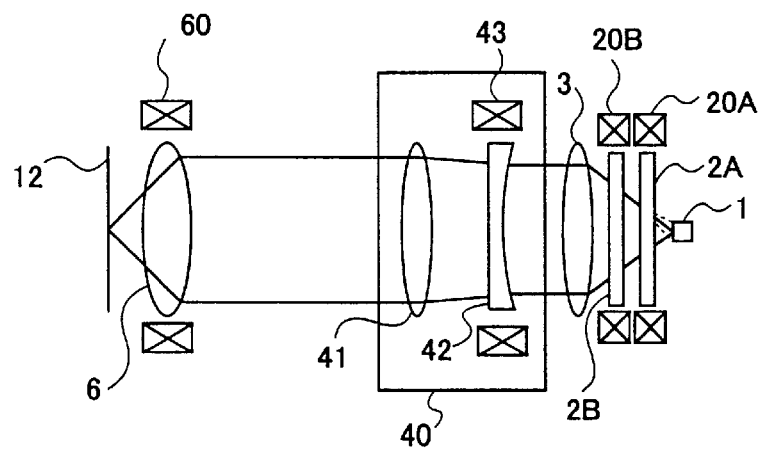
FIG. 11A and FIG. 11B are diagrams for explaining another preferred embodiment of the optical pickup device of the invention in which the grating unit includes two separate gratings.

FIG. 11A shows one preferred embodiment of the optical pickup device of the present invention in which the grating unit includes first and second gratings 2A and 2B that are separate from each other. In FIG. 11A, the elements that are essentially the same as corresponding elements in FIG. 3 are designated by the same reference numerals, and a description thereof will be omitted.

In the optical pickup device of FIG. 11A, the grating unit 2, including the first grating 2A and the second grating 2B, separates the laser beam, emitted by the semiconductor laser 1, into five diffracted beams: the 0th diffracted beam (m=0) and the four 1st diffracted beams (m=±1). The 0th order diffracted beam is created by the laser beam that is straightly passed through the first and second gratings 2A and 2B in common. The four 1st order diffracted beams are created in combination by the two diffracted beams sent by the first grating 2A and by the two diffracted beams sent by the second grating 2B. The collimate lens 3 converts the five diffracted beams, sent by the grating unit 2, into the collimated beams that are parallel to the direction of the optical axis.

In the optical pickup device of FIG. 11A, a first grating actuator 20A is controlled to move the first grating 2A in the direction of the optical axis of the light source 1, and a second grating actuator 20B is controlled to move the second grating 2B in the direction of the optical axis of the light source 1. In the present embodiment, the control of the first grating actautor 20A and the control of the second grating actuator 20B are independently performed by the control unit 9.

In the optical pickup device of FIG. 11A, a main spot is formed on the recording surface 12 by the converging laser beam provided by the objective lens 6 from the 0th order diffracted beam, and two pairs of sub-spots, interposing the main spot between them, are formed on the recording surface 12 by the converging laser beams provided by the objective lens 6 from the four 1st order diffracted beams. Suppose that the recording medium 10 in the present embodiment is a single-layer optical recording medium, for the sake of simplicity of description.

Figure 11B:
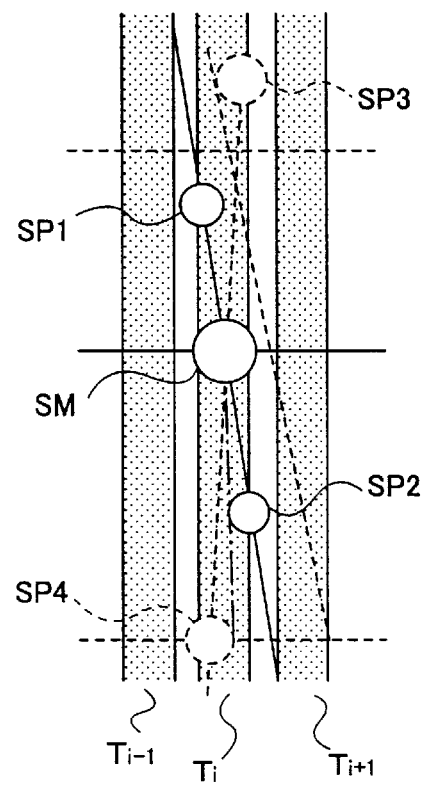

FIG. 11B shows a condition of the beam spots on the recording surface 12 of the recording medium 10 in which the sub-spots with a proper pitch are positioned on the recording surface.

In FIG. 11B, $T_i$, $T_{i-1}$ and $T_{i+1}$ indicate the tracks of the optical recording medium that are adjacent to each other, SM indicates the main spot that is formed on the recording surface of the medium by the 0th order diffracted beam (m=0), and SP1, SP2, SP3 and SP4 indicate the sub-spots that are formed on the recording surface of the medium by the 1st order diffracted beams (m=±1).

In the condition of FIG. 11B, the center of the main spot SM is positioned at the center of the track $T_i$. The pitch of the sub-spots SP1 and SP2 in the transverse direction matches with the width of the track $T_i$. The pitch of the sub-spots SP3 and SP4 in the transverse direction matches with the width of the track $T_i$. The center of each of the sub-spots SP1 and SP4 on the left side of the main spot SM lies at the left-side edge of track $T_i$ and the center of each of the sub-spots SP2 and SP3 on the right side of the main spot SM lies at the right-side edge of the track $T_i$ of the medium.

Suppose that SG1, SG2, SG3 and SG4 respectively indicate the detection signals produced by the photodetector unit from the reflection beams received from the sub-spots SP1, SP2, SP3 and SP4 of the medium 10. In the optical pickup device of FIG. 11A, a tracking error signal TE is generated based on a sum of the difference (SG1–SG2) between the quantities of light of the reflection beams from the sub-spots SP1 and SP2 of the medium and the difference (SG3–SG4) between the quantities of light of the reflection beams from the sub-spots SP3 and SP4 of the medium. Alternatively, the tracking error signal TE may be generated based on a sum of the difference (SG1–SG3) between the quantities of light of the reflection beams from the sub-spots SP1 and SP3 of the medium and the difference (SG4–SG2) between the quantities of light of the reflection beams from the sub-spots SP4 and SP2 of the medium.

The tracking error signal, which is generated when the sub-spots are positioned as in FIG. 11B, has the maximum amplitude. The optical pickup device in this condition provides good tracking control. The positions of the sub-spots SP1, SP2, SP3 and SP4 shown in FIG. 11B will be referred to as the proper positions.

In the above-described embodiment of FIG. 11A, in order to correct the spherical aberration due to the deviation of the substrate thickness of the medium, the collimate lens 3 is moved relative to the light source 1 by using the actuator 30. As described earlier, the sub-spot positions on the recording surface 12 are shifted after the spherical aberration correction is performed.

Figure 12:
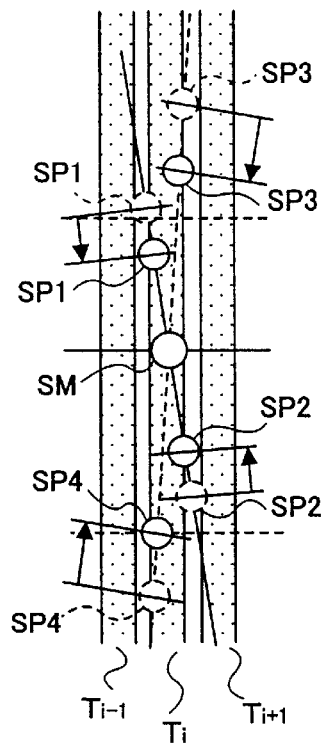
FIG. 12 is a diagram for explaining a method of correcting the shifting of the sub-spot positions by movement of the two gratings.

FIG. 12 shows a method of correcting the shifting of the sub-spot positions by the translational movement of the two gratings 2A and 2B. Suppose that, after the spherical aberration correction is performed, the proper positions of the sub-spots SP1 through SP4, which are indicated by the solid lines in FIG. 12, are shifted to the positions indicated by the dotted lines in FIG. 12.

In the present embodiment, in order to correct the shifting of the sub-spot positions on the recording surface of the medium, the first grating 2A is moved closer to the light source 1 by controlling the actuator 20A, and the second grating 2B is moved closer to the light source 1 by controlling the actuator 20B. As indicated by the arrows in FIG. 12, the sub-spots SP1 and SP2 with the proper pitch are positioned again on the recording surface by the translational movement of the first grating 2A relative to the light source 1, and the sub-spots SP3 and SP4 with the proper pitch are positioned again on the recording surface by the translational movement of the second grating 2B relative to the light source 1. The tracking error signal, which is generated when the sub-spots are positioned as indicated by the solid lines in FIG. 12, has the maximum amplitude. The optical pickup device in this condition provides good tracking control.

In the above-described embodiment, suppose that the tracking error signal TE is generated based on the sum of the difference (SG1–SG2) between the quantities of light of the reflection beams from the sub-spots SP1 and SP2 of the medium and the difference (SG3–SG4) between the quantities of light of the reflection beams from the sub-spots SP3 and SP4 of the medium. It is also possible to improve the accuracy of the sub-spot tracking control to some degree solely by the translational movement of the first grating 2A relative to the light source 1 according to the above method of correcting the shifting of the sub-spot positions. In such a case, the first term (SG1–SG2) in the sum {(SG1–SG2)+ (SG3–SG4)} is effectively corrected, and therefore the accuracy of the sub-spot tracking control can be improved to some degree.

In the above-described embodiment, the grating unit 2 includes the first grating 2A and the second grating 2B that are separate from each other. The shifting of the sub-spot positions due to the spherical aberration correction is canceled by the translational movement of the first and second gratings 2A and 2B relative to the light source 1. Alternatively, the shifting of the sub-spot positions may be canceled by the rotational movement of the first and second gratings 2A and 2B relative to the light source 1. Further, the shifting of the sub-spot positions may be canceled by at least one of the translational movement of the grating unit 2 relative to the light source 1 and the rotational movement of the grating unit 2 relative to the light source 1.

Figure 13A:
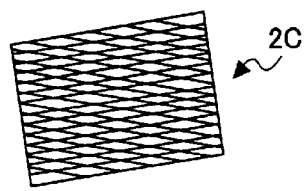
FIG. 13A and FIG. 13B are diagrams of an intersection grating unit for use in the optical pickup device of the present invention.
Figure 13B:
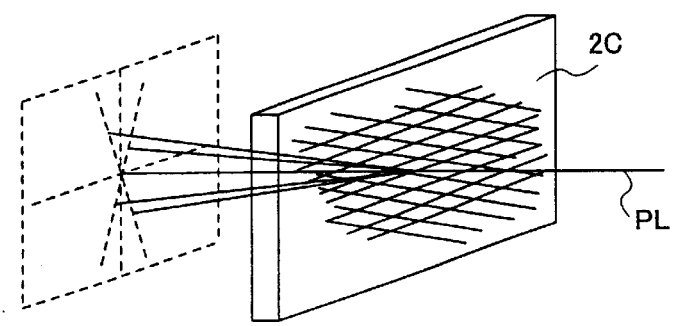

FIG. 13A and FIG. 13B show an intersection grating unit 2C for use in the optical pickup device of the present invention.

As shown in FIG. 13A, a first grating and a second grating are collectively formed on the surface of the intersection grating unit 2C such that a pattern of the first grating and a pattern of the second grating intersect each other on the surface of the intersection grating unit 2C.

As shown in FIG. 13B, when a principal laser beam PL is transmitted through the intersection grating unit 2C, the grating unit 2C creates the five diffracted beams: the 0th diffracted beam (m=0) and the four 1st diffracted beams (m=±1). Namely, the intersection grating unit 2C provides the same function as that of the first and second gratings 2A and 2B in the previous embodiment of FIG. 11A.

In the case in which the intersection grating unit 2C is used instead of the first and second gratings 2A and 2B, it is possible to make the structure of the optical pickup device smaller than that od the previous embodiment of FIG. 11A.

Similar to the previous embodiment of FIG. 11A, in the present embodiment, the shifting of the sub-spot positions due to the spherical aberration correction can be canceled by at least one of a translational movement of the grating unit 2C relative to the light source 1 and a rotational movement of the grating unit 2C relative to the light source 1.

When the shifting of the sub-spot positions is canceled by the rotational movement of the grating unit 2C, the sub-spots SP1 through SP4 are integrally rotated around the position of the main spot SM at the same time. All the sub-spot positions cannot be set to the proper positions. However, in the case in which the tracking error signal TE is generated based on the sum of the difference (SG1–SG2) between the quantities of light of the reflection beams from the sub-spots SP1 and SP2 of the medium and the difference (SG3–SG4) between the quantities of light of the reflection beams from the sub-spots SP3 and SP4 of the medium, it is possible to improve the accuracy of the sub-spot tracking control to some degree solely by setting the sub-spots SP1 and SP2 to the proper positions by the rotational movement of the grating unit 2C.

As shown in FIG. 11B, when the grating unit 2 includes two different gratings, the sub-spots, formed on the recording surface 12 of the medium by the 1st diffracted beams sent from the grating unit 2, includes a pair of first sub-spots SP1 and SP3 preceding the position of the main spot SM on the track $T_i$ of the medium and a pair of second sub-spots SP2 and SP4 following the position of the main spot SM on the track $T_i$ of the medium. In such embodiment, a tracking error signal TE may be generated based on a difference between the quantities of light of the reflection beams received from the first sub-spots SP1 and SP3 of the medium.

Alternatively, in the above-mentioned embodiment, a tracking error signal TE may be generated based on a sum of a difference between the quantities of light of the reflection beams received from the first sub-spots SP1 and SP3 of the medium and a difference between the quantities of light of the reflection beams received from the second sub-spots SP2 and SP4 of the medium.

Further, in one preferred embodiment of the optical pickup device of the present invention wherein the grating unit 2 includes two different gratings and the sub-spots includes the pair of first sub-spots SP1 and SP3 preceding the position of the main spot SM on the track $T_i$ of the medium and the pair of second sub-spots SP2 and SP4 following the position of the main spot SM on the track $T_i$ of the medium, a write verify signal may be generated based on each of a sum of the quantities of light of the reflection beams from the first sub-spots SP1 and SP3 of the medium and a sum of the quantities of light of the reflection beams from the second sub-spots SP2 and SP4 of the medium. By comparing the write verify signal generated based on the sum of the reflection beams related to the first sub-spots SP1 and SP3 and the write verify signal generated based on the sum of the reflection beams related to the second sub-spots SP2 and SP4, it is determined whether the data written to the medium is correct. When a match between the two write verify signals occurs, it is determined that the data written to the medum is correct. When the match does not occur, it is determined that the data written to the medium is incorrect.

Figure 14:
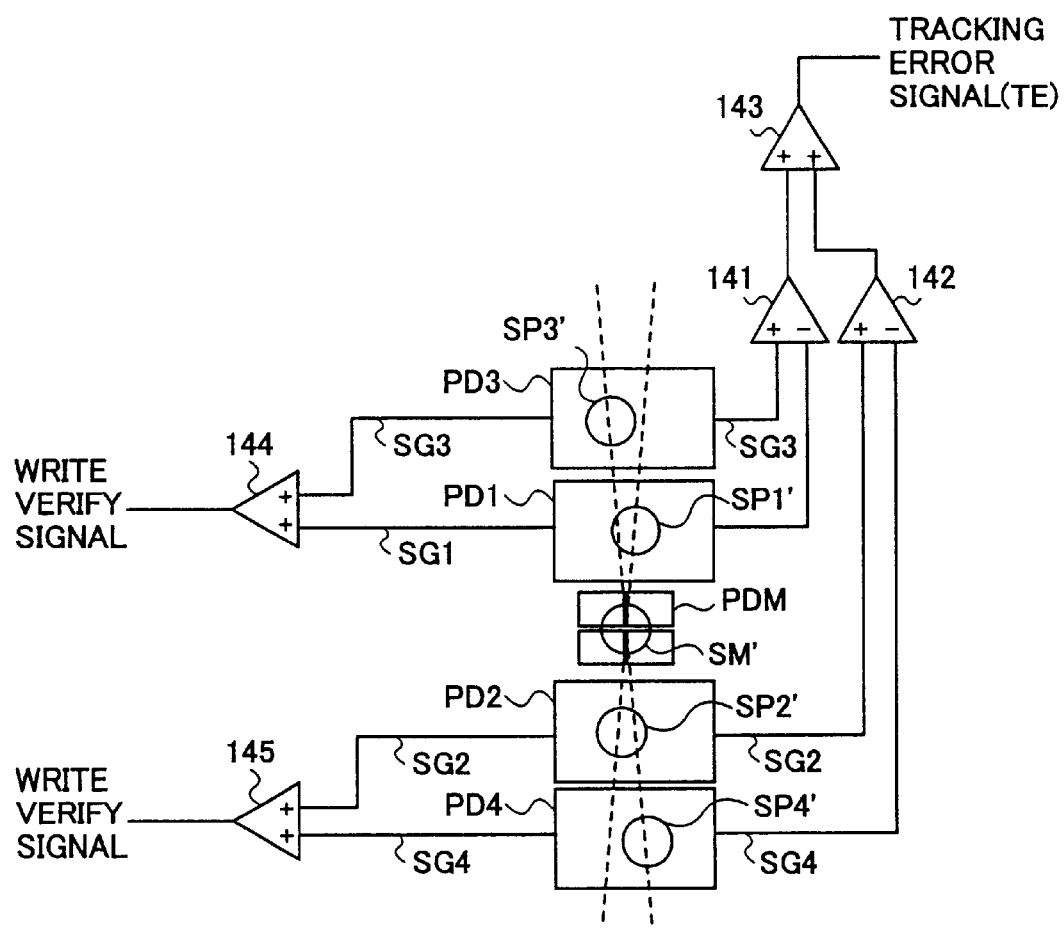
FIG. 14 is a block diagram of a portion of the photodetector unit and the control unit which generates a tracking error signal from the reflection beams from the four sub-spots of the medium in the present embodiment.

A description will be given of the above-mentioned embodiment of the optical pickup device of the present invention with reference to FIG. 14. FIG. 14 shows a portion of the photodetector unit 8 and the control unit 9 in the present embodiment that generates a tracking error signal TE from the reflection beams from the four sub-spots of the medium.

As shown in FIG. 14, the reflection beam receiving section of the photodetector unit 8 includes a main receiving section PDM and four sub-receiving sections PD1, PD2, PD3 and PD4. The main receiving section PDM receives the reflection beam (which forms a main spot SM' on the PDM surface) from the main spot SM of the recording medium. The sub-receiving sections PD1 and PD3 respectively receive the reflection beams (which form sub-spots SP1' and SP3' on the PD1 and PD3 surfaces) from the first sub-spots SP1 and SP3 of the recording medium. The sub-receiving sections PD2 and PD4 respectively receive the reflection beams (which form sub-spots SP2' and SP4' on the PD2 and PD4 surfaces) from the sub-spots SP2 and SP4 of the recording medium.

In the photodetector unit 8 of the above embodiment, the sub-receiving sections PD1 and PD3 output detection signals SG1 and SG3 The sub-receiving sections PD2 and PD4 output detection signals SG2 and SG4.

Figure 15:
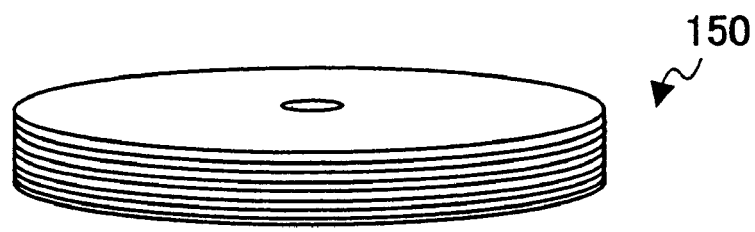
FIG. 15 is a diagram of a multi-layer optical recording medium.

In the present embodiment,

FIG. 15 shows a multi-layer optical recording medium 150. As shown in FIG. 15, the multi-layer optical recording medium 150 includes multiple recording layers, and each recording layer has a transparent substrate and a recording surface on the substrate.

Figure 16:
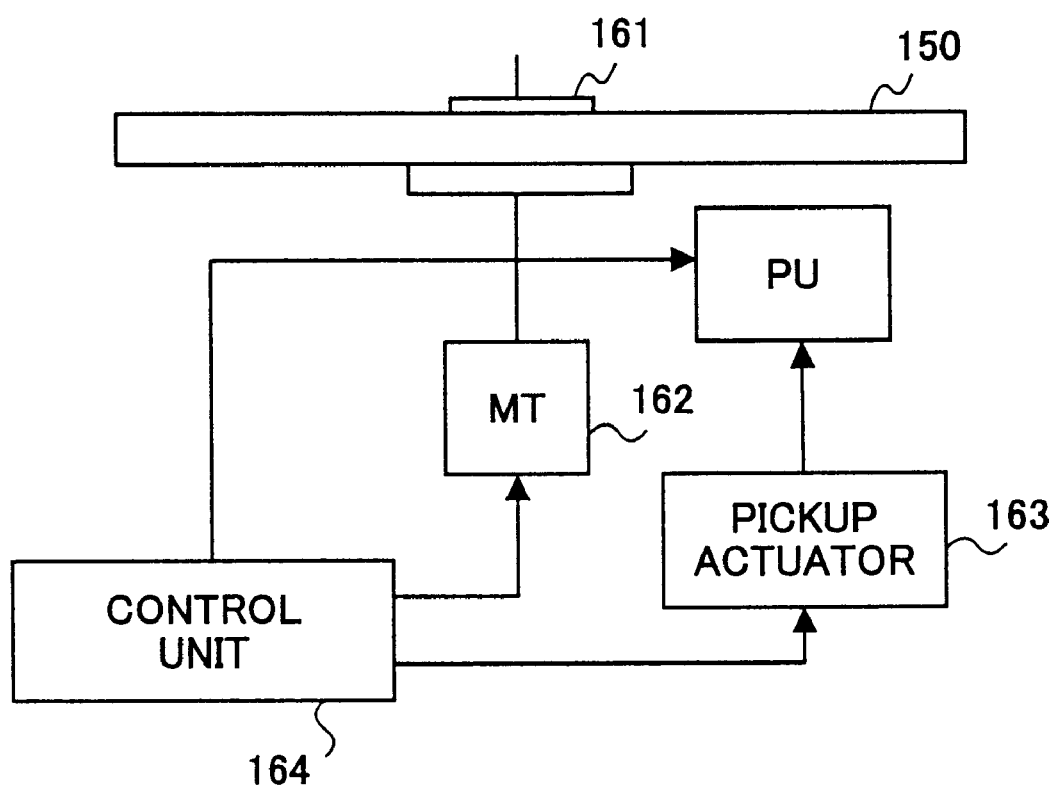
FIG. 16 is a diagram of one preferred embodiment of the optical information processing apparatus in which one embodiment of the optical pickup device of the invention is provided.

FIG. 16 shows one preferred embodiment of the optical information processing apparatus in which the optical pickup device of the present invention is provided.

As shown in FIG. 16, in the optical information processing apparatus of the present embodiment, the multi-layer optical recording medium 150 (shown in FIG. 15) is retained by a holder 161. A motor (MT) 162 is provided to rotate the multi-layer optical recording medium 150. The medium 150, which is retained by the holder 161, is rotated around the central axis of the medium 150 by the motor 162. A pickup (PU), which is the optical pickup device of the present invention, is arranged at a location facing a bottom surface of the optical recording medium 150. The pickup PU is provided to access a given one of the multiple recording layers in the medium 150. Hereinafter, "access" means to record data onto the medium 150, reproduce data from the medium 150, or erase data on the medium 150 by irradiating the medium 150 with light. Suppose that, in the present embodiment, the optical pickup device of FIG. 1 is used as the pickup PU in the optical information processing apparatus of FIG. 16.

In the optical information processing apparatus of FIG. 16, a pickup actuator 163 is provided to move the pickup PU in a radial direction of the medium 150. When the medium 150 is accessed, the pickup actuator 163 is controlled to move the pickup PU in a radial direction of the medium 150. A control unit 164 controls the pickup actuator 163, the pickup PU and the motor 162. In the optical information processing apparatus of FIG. 16, the control unit 164 is constituted by a microcomputer. Suppose that the control unit 164 in the present embodiment is configured to have the functions and capabilities that are provided by the control unit 9 in the previous embodiment of FIG. 1.

When recording data onto the medium 150, the optical information processing apparatus of the present embodiment performs the following procedures.

First, the control unit 164 determines which of the multiple recording layers in the optical recording medium 150 is subjected to the recording. When the recording layer of the medium 150 to be accessed is given, the control unit 164 calculates the location or depth of the given one of the multiple recording layers in the medium 150 from the bottom surface of the medium 150. When the depth of the given recording layer is calculated, the control unit 164 calculates a quantity of the spherical aberration based on the calculated depth.

The quantity of the spherical aberration, if it is calculated, is the base on which the control unit 164 controls the collimate lens actuator 30 in order to correct the spherical aberration due to the location of the given one of the multiple recording layers of the medium 150 from the medium surface.

Second, the control unit 164 calculates a displacement of the collimate lens 3 relative to the light source 1 based on the calculated quantity of the spherical aberration. As described earlier, in the embodiment of FIG. 1, the movement of the collimate lens 3 relative to the light source 1 is needed to correct the spherical aberration.

The displacement of the collimate lens 3, if it is calculated, is the base on which the control unit 164 controls the grating actuator 20 in order to cancel the shifting of the sub-spot positions due to the spherical aberration correction.

Third, the control unit 164 calculates a displacement of the grating unit 2 relative to the light source 1 based on the calculated displacement of the collimate lens 3. Namely, the displacement of the grating unit 2 to be moved relative to the light source 1 is determined from the displacement of the collimate lens 3 moved relative to the light source 1.

Fourth, the control unit 164 controls the actuator 30 and the actuator 20 based on the calculated displacements so that the collimate lens 3 and the grating unit 2 are moved relative to the light source 1.

Furthermore, the control unit 164 controls the pickup actuator 163 to move the pickup PU in a radial direction of the medium 150 so that the pickup PU emits a laser beam to a content section of the recording surface of the medium 150 to read a recording surface number from the content section of the medium. Based on the recording surface number being read, it is determined whether the beam spots are formed on the correct recording surface of the medium. Namely, the correct recording surface is the recording surface of the given recording layer of the medium that is predetermiend. If a match between the actually detected recording surface and the predetermined recording surface does not occur, the control unit 164 again calculates the displacements of the collimate lens 3 and the grating unit 2 based on a difference between the detected recording surface number and the predetermined number. The above procedures are repeated until the match occurs.

After it is determined that the beam spots are formed on the correct recording surface of the medium, the control unit 164 controls the pickup actuator 163, the pickup PU and the motor 162 so that the optical information processing apparatus of the present embodiment performs the recording of data onto the recording surface of the given recording layer of the medium 150. In order to perform the reproducing of data from the medium or the erasing of data on the medium, the optical information processing apparatus of the present embodiment performs similar procedures.

The present invention is not limited to the above-described embodiments, and variations and modifications may be made without departing from the scope of the present invention.

Further, the present invention is based on Japanese priority application No.2000-203860, filed on Jul. 5, 2000, the entire contents of which are hereby incorporated by reference.

What is claimed is:

1. An optical pickup method for accessing an optical recording medium, the medium including a transparent substrate and a recording surface on the substrate, the optical pickup method comprising the steps of:

passing a light beam, emitted by a light source, through a grating unit to separate the emitted light beam into a 0th order diffracted beam and 1st order diffracted beams;

passing the diffracted beams, sent from the grating unit, through an objective lens to focus the beams onto the recording surface of the medium through the substrate, so that a main spot is formed on the recording surface by the 0th order diffracted beam and sub-spots, interposing the main spot therebetween, are formed on the recording surface by the 1st order diffracted beams;

receiving respective reflection beams from the main spot and the sub-spots of the medium to generate detection signals from the received reflection beams;

changing a pattern of the beams incident to the objective lens to correct a spherical aberration due to a deviation of a thickness of the substrate of the medium; and moving the grating unit relative to the light source along an optical axis to cancel shifting of sub-spot positions on the recording surface due to the spherical aberration correction, in order to generate a proper tracking error signal.

2. The optical pickup method according to claim 1, wherein, in said moving step, a rotational movement of the grating unit relative to the light source is performed to cancel the shifting of the sub-spot positions.

3. The optical pickup method according to claim 1, wherein a collimate lens is provided between the grating unit and the objective lens to convert the diffracted beams from the grating unit into collimated beams and send the collimated beams to the objective lens, and wherein, in said changing step, the collimate lens is moved relative to the light source to change the pattern of the beams incident to the objective lens in order to correct the spherical aberration.

4. The optical pickup method according to claim 1, wherein, in said changing step, the light source is moved relative to the objective lens to change the pattern of the beams incident to the objective lens in order to correct the spherical aberration.

5. The optical pickup method according to claim 1, wherein a spherical aberration correcting unit is provided between the grating unit and the objective lens to change the pattern of the beams incident to the objective lens, so that the spherical aberration correcting unit corrects the spherical aberration.

6. The optical pickup method according to claim 5, wherein a collimate lens is provided between the grating unit and the spherical aberration correcting unit to convert the diffracted beams from the grating unit into collimated beams and send the collimated beams to the spherical aberration correcting unit.

7. The optical pickup method according to claim 5, wherein the spherical aberration correcting unit comprises a positive lens and a negative lens, and at least one of the positive lens and the negative lens is moved relative to the light source to change the pattern of the beams incident to the objective lens, so that the spherical aberration correcting unit corrects the spherical aberration.

8. The optical pickup method according to claim 5, wherein the spherical aberration correcting unit comprises a first positive lens and a second positive lens, and at least one of the first and second positive lenses is moved relative to the light source to change the pattern of the beams incident to the objective lens, so that the spherical aberration correcting unit corrects the spherical aberration.

9. The optical pickup method according to claim 3, wherein a displacement of the grating unit to be moved relative to the light source is determined from a displacement of the collimate lens moved relative to the light source.

10. The optical pickup method according to claim 3, wherein a tracking error signal is generated based on a difference between quantities of light of the reflection beams received from the sub-spots of the medium.

11. The optical pickup method according to claim 1, wherein a tracking error signal is generated based on a difference between quantities of light of the reflection beams received from the sub-spots of the medium, and the movement of the grating unit relative to the light source is performed to allow the tracking error signal to have a maximum amplitude.

12. The optical pickup method according to claim 11, wherein a collimate lens is provided between the grating unit and the objective lens to convert the diffracted beams from the grating unit into collimated beams and send the collimated beams to the objective lens, and
wherein, in said changing step, the collimate lens is moved relative to the light source to change the pattern of the beams incident to the objective lens in order to correct the spherical aberration.

13. The optical pickup method according to claim 11, wherein, in said changing step, the light source is moved relative to the objective lens to change the pattern of the beams incident to the objective lens in order to correct the spherical aberration.

14. The optical pickup method according to claim 11, wherein a spherical aberration correcting unit is provided between the grating unit and the objective lens to change the pattern of the beams incident to the objective lens, so that the spherical aberration correcting unit corrects the spherical aberration.

15. The optical pickup method according to claim 14, wherein a collimate lens is provided between the grating unit and the spherical aberration correcting unit to convert the diffracted beams from the grating unit into collimated beams and send the collimated beams to the spherical aberration correcting unit.

16. The optical pickup method according to claim 15, wherein the spherical aberration correcting unit comprises a positive lens and a negative lens, and at least one of the positive lens and the negative lens is moved relative to the light source to change the pattern of the beams incident to the objective lens, so that the spherical aberration correcting unit corrects the spherical aberration.

17. The optical pickup method according to claim 15, wherein the spherical aberration correcting unit comprises a first positive lens and a second positive lens, and at least one of the first and second positive lenses is moved relative to the light source to change the pattern of the beams incident to the objective lens, so that the spherical aberration correcting unit corrects the spherical aberration.

18. An optical pickup method for accessing an optical recording medium, the medium including a transparent substrate and a recording surface on the substrate, the optical pickup method comprising the steps of:
passing a light beam, emitted by a light source, through a grating unit to separate the emitted light beam into a 0th order diffracted beam and 1st order diffracted beams;
passing the diffracted beams, sent from the grating unit, through an objective lens to focus the beams onto the recording surface of the medium through the substrate, so that a main spot is formed on the recording surface by the 0th order diffracted beam and sub-spots, interposing the main spot therebetween, are formed on the recording surface by the 1st order diffracted beams;
receiving respective reflection beams from the main spot and the sub-spots of the medium to generate detection signals from the received reflection beams;
changing a pattern of the beams incident to the objective lens to correct a spherical aberration due to a deviation of a thickness of the substrate of the medium; and
moving the grating unit relative to the light source to cancel shifting of sub-spot positions on the recording surface due to the spherical aberration correction, in order to generate a proper tracking error signal,
wherein, in said moving step, a translational movement of the grating unit relative to the light source is performed to cancel the shifting of the sub-spot positions.

19. An optical pickup method for accessing an optical recording medium, the medium including a transparent substrate and a recording surface on the substrate, the optical pickup method comprising the steps of:
passing a light beam, emitted by a light source, through a grating unit to separate the emitted light beam into a 0th order diffracted beam and 1st order diffracted beams;
passing the diffracted beams, sent from the grating unit, through an objective lens to focus the beams onto the recording surface of the medium through the substrate, so that a main spot is formed on the recording surface by the 0th order diffracted beam and sub-spots, interposing the main spot therebetween, are formed on the recording surface by the 1st order diffracted beams;
receiving respective reflection beams from the main spot and the sub-spots of the medium to generate detection signals from the received reflection beams;
changing a pattern of the beams incident to the objective lens to correct a spherical aberration due to a deviation of a thickness of the substrate of the medium; and
moving the grating unit relative to the light source to cancel shifting of sub-spot positions on the recording surface due to the spherical aberration correction, in order to generate a proper tracking error signal,
wherein, in said moving step, both a translational movement and a rotational movement of the grating unit relative to the light source are performed to cancel the shifting of the sub-spot positions.

20. An optical pickup device for accessing an optical recording medium, the medium including a transparent substrate and a recording surface on the substrate, the optical pickup device comprising:
a light source emitting a light beam;
a grating unit separating the light beam, emitted by the light source, into a 0th order diffracted beam and 1st order diffracted beams;
an objective lens focusing the diffracted beams, sent from the grating unit, onto the recording surface of the medium through the substrate, so that a main spot is formed on the recording surface by the 0th order diffracted beam and sub-spots, interposing the main spot therebetween, are formed on the recording surface by the 1st order diffracted beams;
a reflection beam detector receiving reflection beams from the main spot and the sub-spots of the medium to generate detection signals from the received reflection beams; and a control unit changing a pattern of the beams incident to the objective lens to correct a spherical aberration due to a deviation of a thickness of the substrate of the medium, and the control unit moving the grating unit relative to the light source along an optical axis to cancel shifting of sub-spot positions on the recording surface due to the spherical aberration correction, in order to generate a proper tracking error signal.

21. The optical pickup device according to claim 20, wherein the reflection beam detector includes a plurality of sub-receiving sections, and the reflection beam detector is configured so that the sub-receiving sections are capable of receiving the respective reflection beams from the sub-spots of the medium, regardless of whether the sub-spot positions on the recording surface are shifted due to the spherical aberration correction.

22. An optical pickup method for accessing an optical recording medium, the medium including a transparent substrate and a recording surface on the substrate, the optical pickup method comprising the steps of:

passing a light beam, emitted by a light source, through a grating unit to separate the emitted light beam into a 0th order diffracted beam and 1st order diffracted beams;

passing the diffracted beams, sent from the grating unit, through an objective lens to focus the beams onto the recording surface of the medium through the substrate, so that a main spot is formed on the recording surface by the 0th order diffracted beam and sub-spots, interposing the main spot therebetween, are formed on the recording surface by the 1st order diffracted beams;

receiving respective reflection beams from the main spot and the sub-spots of the medium to generate detection signals from the received reflection beams;

changing a pattern of the beams incident to the objective lens to correct a spherical aberration due to a deviation of a thickness of the substrate of the medium; and moving the grating unit relative to the light source to cancel shifting of sub-spot positions on the recording surface due to the spherical aberration correction, in order to generate a proper tracking error signal, wherein the grating unit includes a first grating and a second grating, and the grating unit separates the emitted light beam into one 0th order diffracted beam and four 1st order diffracted beams by passing the emitted light beam through both the first and second gratings.

23. The optical pickup method according to claim 22, wherein the first grating and the second grating are collectively formed on the grating unit such that a pattern of the first grating and a pattern of the second grating intersect each other on a surface of the grating unit.

24. The optical pickup method according to claim 23, wherein, in said moving step, at least one of a translational movement of the grating unit relative to the light source and a rotational movement of the grating unit relative to the light source is performed to cancel the shifting of the sub-spot positions.

25. The optical pickup method according to claim 22, wherein the sub-spots, formed on the recording surface of the medium by the 1st order diffracted beams sent from the grating unit, include a pair of first sub-spots preceding a position of the main spot on a track of the medium and a pair of second sub-spots following the position of the main spot on the track of the medium, and wherein a tracking error signal is generated based on a difference between quantities of light of the reflection beams received from the first sub-spots of the medium.

26. The optical pickup method according to claim 22, wherein the sub-spots, formed on the recording surface of the medium by the 1st order diffracted beams sent from the grating unit, include a pair of first sub-spots preceding a position of the main spot on a track of the medium and a pair of second sub-spots following the position of the main spot on the track of the medium, and wherein a tracking error signal is generated based on a sum of a difference between quantities of light of the reflection beams received from the first sub-spots of the medium and a difference between quantities of light of the reflection beams received from the second sub-spots of the medium.

27. The optical pickup method according to claim 22, wherein the sub-spots, formed on the recording surface of the medium by the 1st order diffracted beams sent from the grating unit, include a pair of first sub-spots preceding a position of the main spot on a track of the medium and a pair of second sub-spots following the position of the main spot on the track of the medium, and wherein a write verify signal is generated based on each of a sum of quantities of light of the reflection beams received from the first sub-spots of the medium and a sum of quantities of light of the reflection beams received from the second sub-spots of the medium.

28. An optical pickup method for accessing an optical recording medium, the medium including a transparent substrate and a recording surface on the substrate, the optical pickup method comprising the steps of:

passing a light beam, emitted by a light source, through a grating unit to separate the emitted light beam into a 0th order diffracted beam and 1st order diffracted beams;

passing the diffracted beams, sent from the grating unit, through an objective lens to focus the beams onto the recording surface of the medium through the substrate, so that a main spot is formed on the recording surface by the 0th order diffracted beam and sub-spots, interposing the main spot therebetween, are formed on the recording surface by the 1st order diffracted beams;

receiving respective reflection beams from the main spot and the sub-spots of the medium to generate detection signals from the received reflection beams;

changing a pattern of the beams incident to the objective lens to correct a spherical aberration due to a deviation of a thickness of the substrate of the medium; and moving the grating unit relative to the light source to cancel shifting of sub-spot positions on the recording surface due to the spherical aberration correction, in order to generate a proper tracking error signal, wherein the grating unit includes a first grating and a second grating that are formed into separate pieces.

29. The optical pickup method according to claim 28, wherein, in said moving step, at least one of a translational movement of the grating unit relative to the light source and a rotational movement of the grating unit relative to the light source is performed to cancel the shifting of the sub-spot positions.

30. An optical pickup device for accessing an optical recording medium, the medium including a transparent substrate and a recording surface on the substrate, the optical pickup device comprising:

a light source emitting a light beam;

a grating unit separating the light beam, emitted by the light source, into a 0th order diffracted beam and 1st order diffracted beams;

an objective lens focusing the diffracted beams, sent from the grating unit, onto the recording surface of the medium through the substrate, so that a main spot is formed on the recording surface by the 0th order diffracted beam and sub-spots, interposing the main spot therebetween, are formed on the recording surface by the 1st order diffracted beams;

a reflection beam detector receiving reflection beams from the main spot and the sub-spots of the medium to generate detection signals from the received reflection beams; and a control unit changing a pattern of the beams incident to the objective lens to correct a spherical aberration due to a deviation of a thickness of the substrate of the medium, and the control unit moving the grating unit relative to the light source to cancel shifting of sub-spot positions on the recording surface due to the spherical aberration correction, in order to generate a proper tracking error signal, wherein the grating unit includes a first grating and a second grating, and the grating unit separates the emitted light beam into one 0th order diffracted beam and four 1st order diffracted beams by passing the emitted light beam through both the first and second gratings.

31. An optical pickup method for accessing one of multiple recording layers of a multi-layer optical recording medium, each recording layer including a transparent substrate and a recording surface on the substrate, comprising the steps of:

passing a light beam, emitted by a light source, through a grating unit to separate the emitted light beam into a 0th order diffracted beam and 1st order diffracted beams;

passing the diffracted beams, sent from the grating unit, through an objective lens to focus the beams onto a recording surface of a given one of the multiple recording layers of the medium through the substrate, so that a main spot is formed on the recording surface by the 0th order diffracted beam and sub-spots, interposing the main spot therebetween, are formed on the recording surface by the 1st order diffracted beams;

receiving respective reflection beams from the main spot and the sub-spots of the medium to generate detection signals from the received reflection beams;

changing a pattern of the beams incident to the objective lens to correct a spherical aberration due to a location of the given one of the multiple recording layers of the medium from a bottom surface of the medium; and moving the grating unit relative to the light source along an optical axis to cancel shifting of sub-spot positions on the recording surface due to the spherical aberration correction, in order to generate a proper tracking error signal.

32. An optical pickup method for accessing one of multiple recording layers of a multi-layer optical recording medium, each recording layer including a transparent substrate and a recording surface on the substrate, comprising the steps of:

passing a light beam, emitted by a light source, through a grating unit to separate the emitted light beam into a 0th order diffracted beam and 1st order diffracted beams;

passing the diffracted beams, sent from the grating unit, through an objective lens to focus the beams onto a recording surface of a given one of the multiple recording layers of the medium through the substrate, so that a main spot is formed on the recording surface by the 0th order diffracted beam and sub-spots, interposing the main spot therebetween, are formed on the recording surface by the 1st order diffracted beams;

receiving respective reflection beams from the main spot and the sub-spots of the medium to generate detection signals from the received reflection beams;

changing a pattern of the beams incident to the objective lens to correct a spherical aberration due to a location of the given one of the multiple recording layers of the medium from a bottom surface of the medium; and moving the grating unit relative to the light source to cancel shifting of sub-spot positions on the recording surface due to the spherical aberration correction, in order to generate a proper tracking error signal, wherein the grating unit includes a first grating and a second grating, and the grating unit separates the emitted light beam into one 0th order diffracted beam and four 1st order diffracted beams by passing the emitted light beam through both the first and second gratings.

33. An optical pickup device for accessing one of multiple recording layers of a multi-layer optical recording medium, each recording layer including a transparent substrate and a recording surface on the substrate, the optical pickup device comprising:

a light source emitting a light beam;

a grating unit separating the light beam, emitted by the light source, into a 0th order diffracted beam and 1st order diffracted beams;

an objective lens focusing the diffracted beams, sent from the grating unit, onto a recording surface of a given one of the multiple recording layers of the medium through the substrate, so that a main spot is formed on the recording surface by the 0th order diffracted beam and sub-spots, interposing the main spot therebetween, are formed on the recording surface by the 1st order diffracted beams;

a reflection beam detector receiving reflection beams from the main spot and the sub-spots of the medium to generate detection signals from the received reflection beams; and a control unit changing a pattern of the beams incident to the objective lens to correct a spherical aberration due to a location of the given one of the multiple recording layers of the medium from a surface of the medium, and the control unit moving the grating unit relative to the light source along an optical axis to cancel shifting of sub-spot positions on the recording surface due to the spherical aberration correction, in order to generate a proper tracking error signal.

34. An optical pickup device for accessing one of multiple recording layers of a multi-layer optical recording medium, each recording layer including a transparent substrate and a recording surface on the substrate, the optical pickup device comprising:

a light source emitting a light beam;

a grating unit separating the light beam, emitted by the light source, into a 0th order diffracted beam and 1st order diffracted beams;

an objective lens focusing the diffracted beams, sent from the grating unit, onto a recording surface of a given one of the multiple recording layers of the medium through the substrate, so that a main spot is formed on the recording surface by the 0th order diffracted beam and sub-spots, interposing the main spot therebetween, are formed on the recording surface by the 1st order diffracted beams;

a reflection beam detector receiving reflection beams from the main spot and the sub-spots of the medium to generate detection signals from the received reflection beams; and a control unit changing a pattern of the beams incident to the objective lens to correct a spherical aberration due to a location of the given one of the multiple recording layers of the medium from a surface of the medium, and the control unit moving the grating unit relative to the light source to cancel shifting of sub-spot positions on the recording surface due to the spherical aberration correction, in order to generate a proper tracking error signal, wherein the grating unit includes a first grating and a second grating, and the grating unit separates the emitted light beam into one 0th order diffracted beam and four 1st order diffracted beams by passing the emitted light beam through both the first and second gratings.

35. An optical information processing apparatus in which an optical pickup device is provided to access an optical recording medium, the optical recording medium including a transparent substrate and a recording surface on the substrate, the optical pickup device comprising:

a light source emitting a light beam;

a grating unit separating the light beam, emitted by the light source, into a 0th order diffracted beam and 1st order diffracted beams;

an objective lens focusing the diffracted beams, sent from the grating unit, onto the recording surface of the medium through the substrate, so that a main spot is formed on the recording surface by the 0th order diffracted beam and sub-spots, interposing the main spot therebetween, are formed on the recording surface by the 1st order diffracted beams;

a reflection beam detector receiving reflection beams from the main spot and the sub-spots of the medium to generate detection signals from the received reflection beams; and a control unit changing a pattern of the beams incident to the objective lens to correct a spherical aberration due to a deviation of a thickness of the substrate of the medium, and the control unit moving the grating unit relative to the light source along an optical axis to cancel shifting of sub-spot positions on the recording surface due to the spherical aberration correction, in order to generate a proper tracking error signal.

* * * * *